United States Patent
Hillman et al.

(10) Patent No.: US 10,288,937 B2
(45) Date of Patent: May 14, 2019

(54) DISPLAY SYSTEM WITH DISTRIBUTED LED BACKLIGHT

(71) Applicant: Apple Inc., Cupertino, CA (US)

(72) Inventors: Michael D. Hillman, Los Altos, CA (US); Gregory L. Tice, Los Altos, CA (US); William Sauway Law, San Franicsco, CA (US); Sean Bailey, San Francisco, CA (US); Ann Torres, San Francisco, CA (US); Efrain Alcorta, San Francisco, CA (US); Perry Anderson, Kensington, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 15/130,763

(22) Filed: Apr. 15, 2016

(65) Prior Publication Data

US 2016/0231624 A1    Aug. 11, 2016

Related U.S. Application Data

(63) Continuation of application No. 13/359,308, filed on Jan. 26, 2012, now Pat. No. 9,316,863, which is a continuation of application No. 12/237,331, filed on Sep. 24, 2008, now Pat. No. 8,104,911.

(60) Provisional application No. 60/976,404, filed on Sep. 28, 2007.

(51) Int. Cl.
    *G02F 1/1335* (2006.01)

(52) U.S. Cl.
    CPC .. *G02F 1/133603* (2013.01); *G02F 1/133608* (2013.01); *G02F 2001/133612* (2013.01); *G02F 2001/133628* (2013.01)

(58) Field of Classification Search
    CPC ................... G02F 1/133603; G02F 1/133608
    See application file for complete search history.

(56) References Cited

U.S. PATENT DOCUMENTS

| | | | |
|---|---|---|---|
| 5,075,759 A | 12/1991 | Moline | |
| 5,464,984 A * | 11/1995 | Cox | G01T 1/2018 250/366 |
| 6,789,921 B1 | 9/2004 | Deloy et al. | |
| 6,848,819 B1 | 2/2005 | Arndt et al. | |
| 6,851,831 B2 | 2/2005 | Karlicek, Jr. | |
| 7,311,431 B2 | 12/2007 | Chew et al. | |
| 7,639,315 B2 | 12/2009 | Kao | |
| 7,645,052 B2 | 1/2010 | Villard | |
| 7,646,035 B2 | 1/2010 | Loh et al. | |
| 7,712,917 B2 | 5/2010 | Roberts et al. | |
| 7,744,233 B2 | 6/2010 | Moriyasu et al. | |
| 7,878,680 B2 | 2/2011 | Fujino et al. | |
| 8,075,150 B2 | 12/2011 | Maruyama | |
| 8,104,911 B2 | 1/2012 | Hillman et al. | |
| 2001/0038532 A1 | 11/2001 | Harbers et al. | |

(Continued)

*Primary Examiner* — Sharon E Payne
(74) *Attorney, Agent, or Firm* — Joseph F. Guihan

(57) ABSTRACT

A display system with a distributed LED backlight includes: providing a plurality of tile LED light sources, each tile LED light source having a tile and a plurality of similar LED light sources on each tile connected for emitting light therefrom; orienting the plurality of tile LED light sources for illuminating a display from the back of the display; and integrating the plurality of tile LED light sources into a thermally and mechanically structurally integrated distributed LED tile matrix backlight light source.

20 Claims, 34 Drawing Sheets

(56) References Cited

U.S. PATENT DOCUMENTS

| | | | |
|---|---|---|---|
| 2002/0031316 A1* | 3/2002 | Lowry | G02B 6/06 385/120 |
| 2005/0237739 A1 | 10/2005 | Lee et al. | |
| 2006/0187660 A1* | 8/2006 | Liu | F21V 29/004 362/294 |
| 2006/0232964 A1 | 10/2006 | Hoshi et al. | |
| 2006/0279962 A1 | 12/2006 | Loh | |
| 2007/0115671 A1 | 5/2007 | Roberts et al. | |
| 2007/0230172 A1 | 10/2007 | Wang | |
| 2008/0198114 A1 | 8/2008 | Roberts et al. | |
| 2009/0027588 A1 | 1/2009 | Medendrop, Jr. et al. | |
| 2009/0033612 A1 | 2/2009 | Roberts et al. | |
| 2009/0109655 A1 | 4/2009 | Shinozaki | |
| 2009/0257215 A1 | 10/2009 | Gomi | |

* cited by examiner

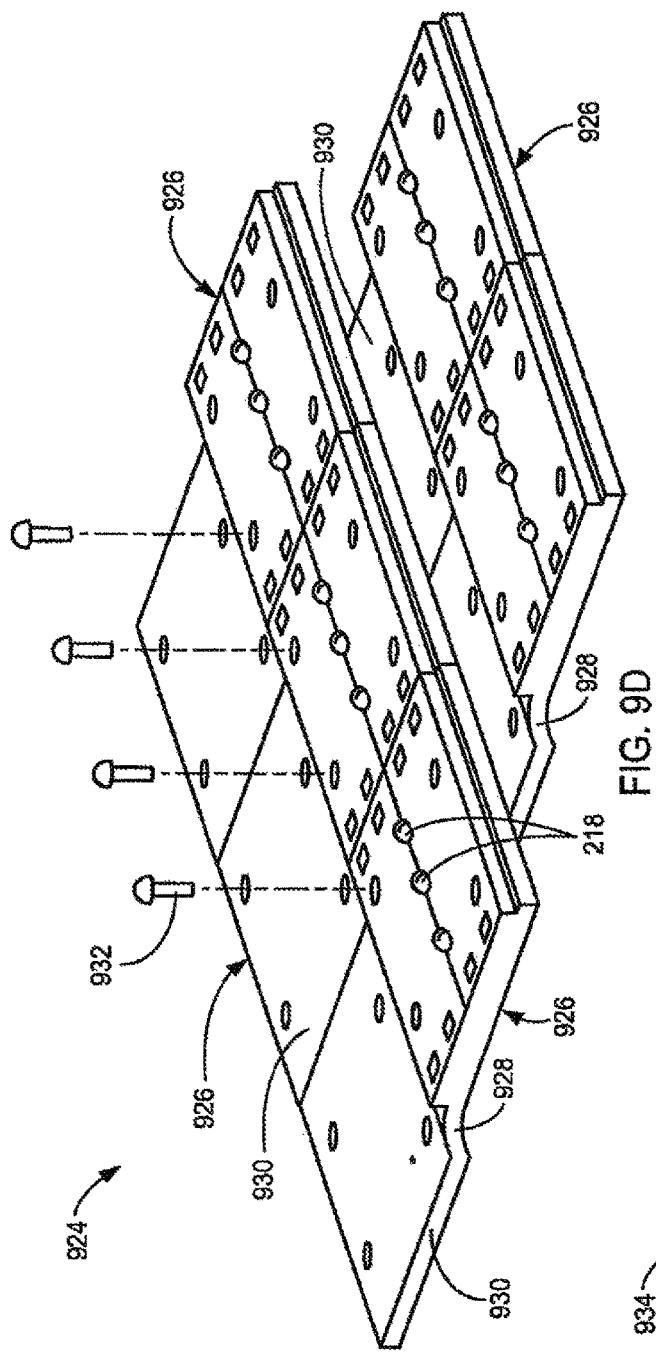
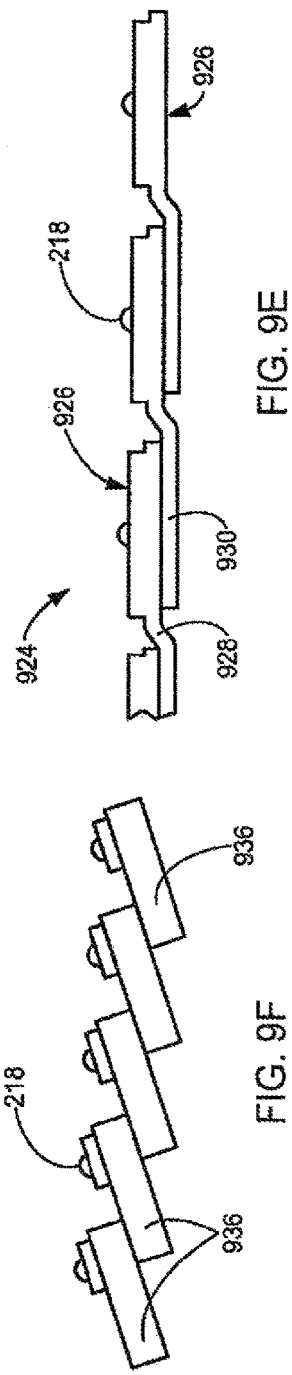
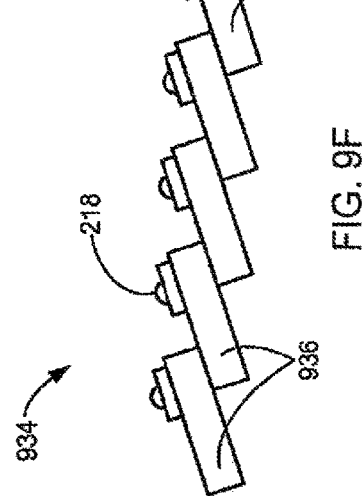

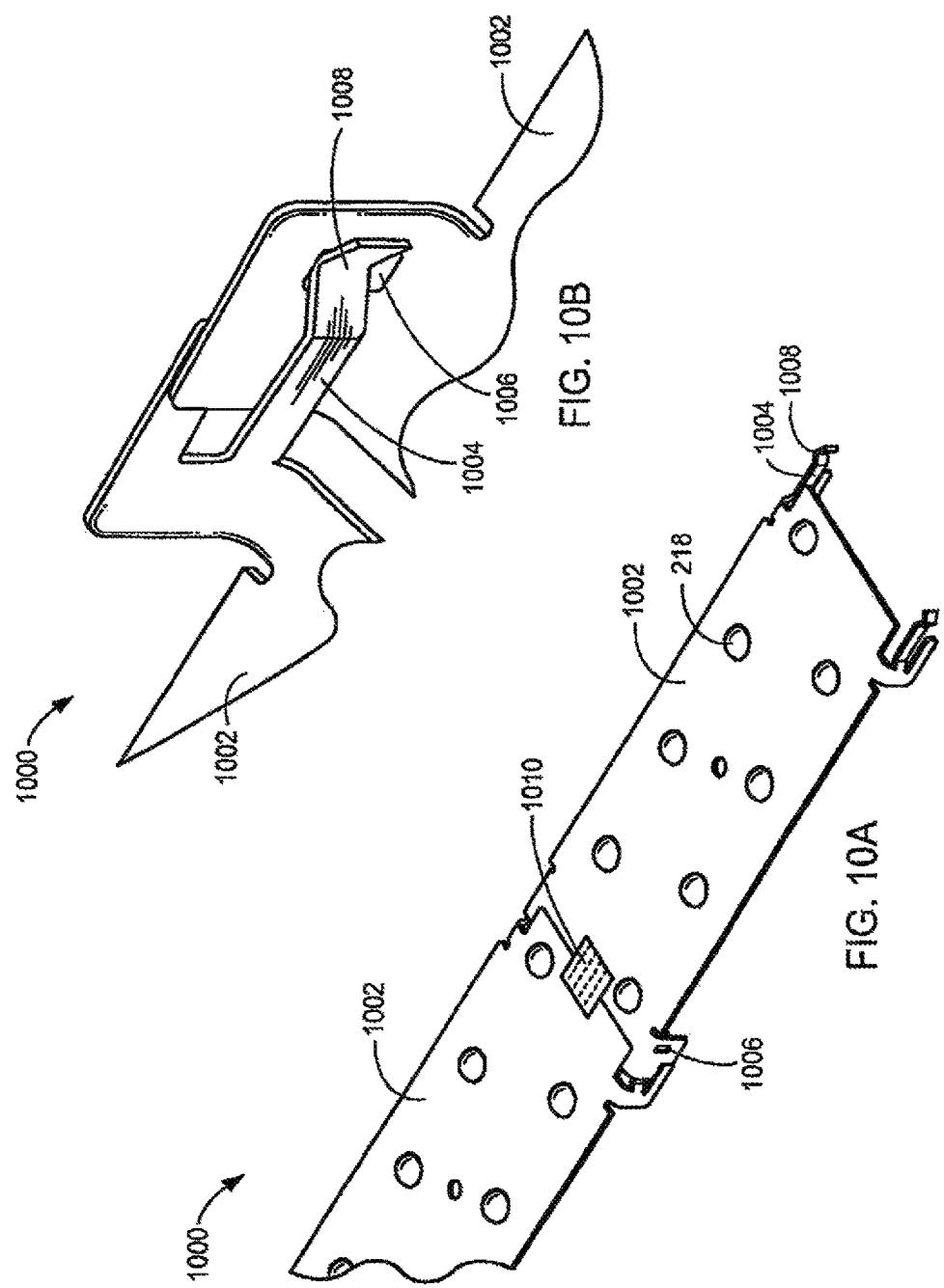

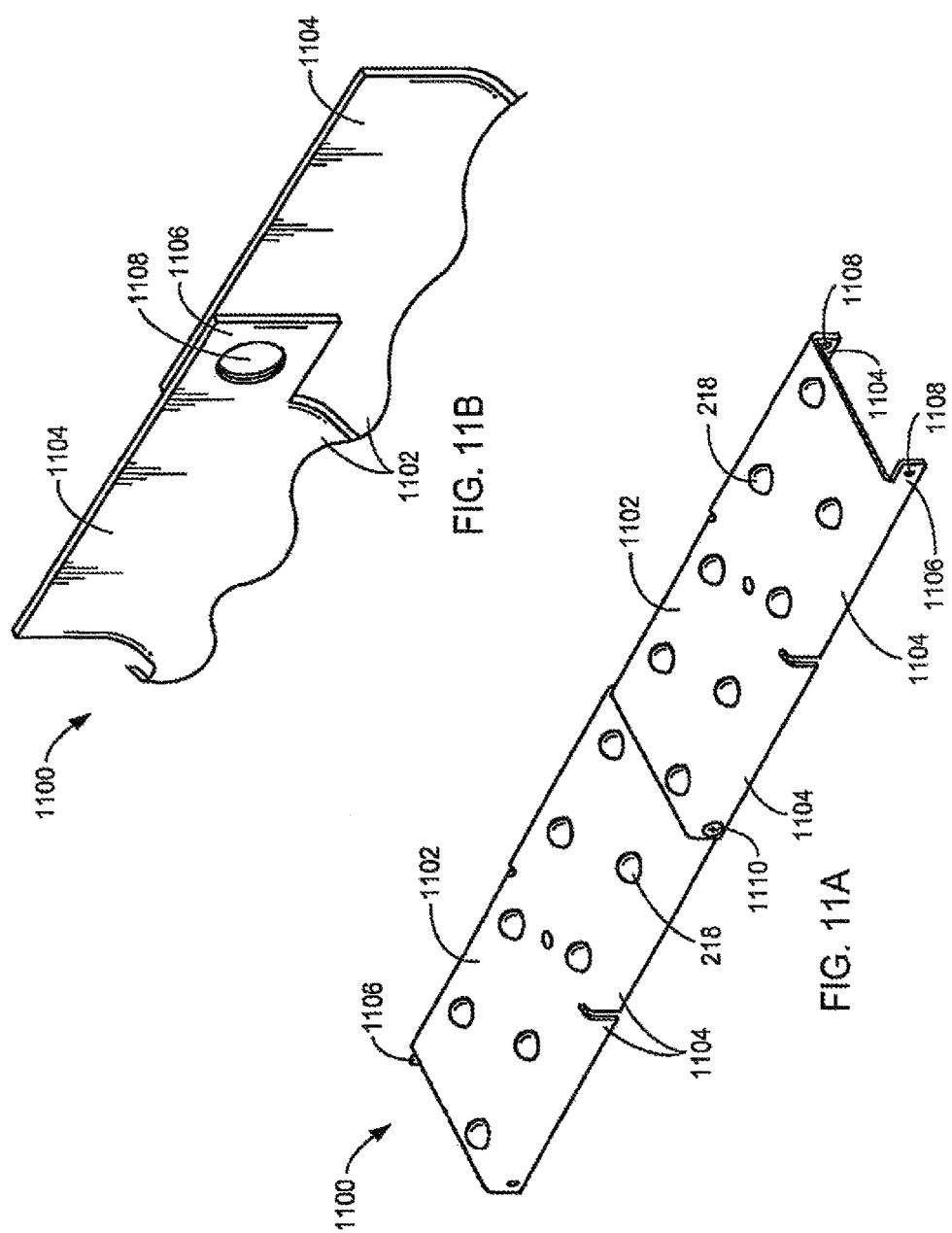

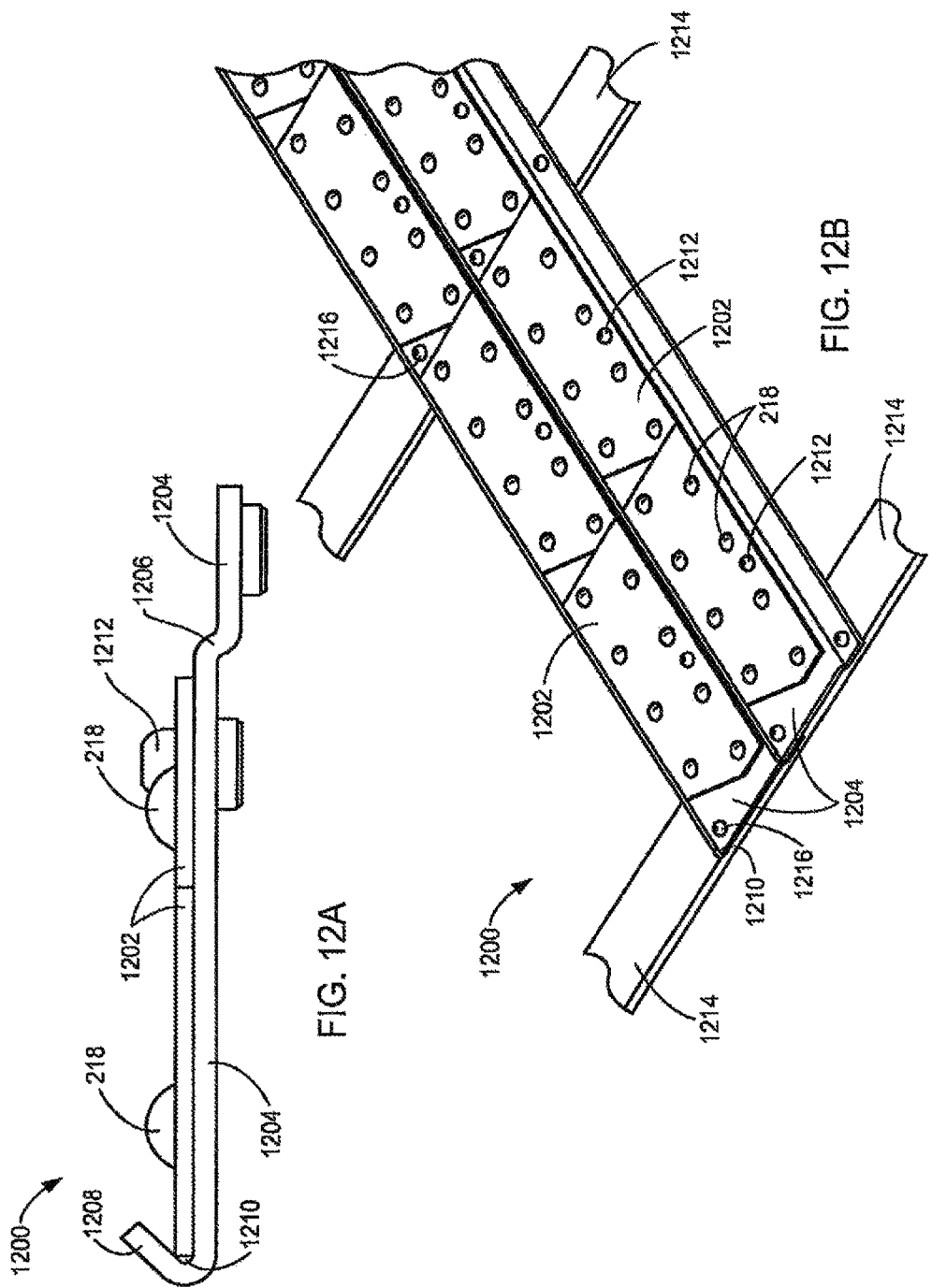

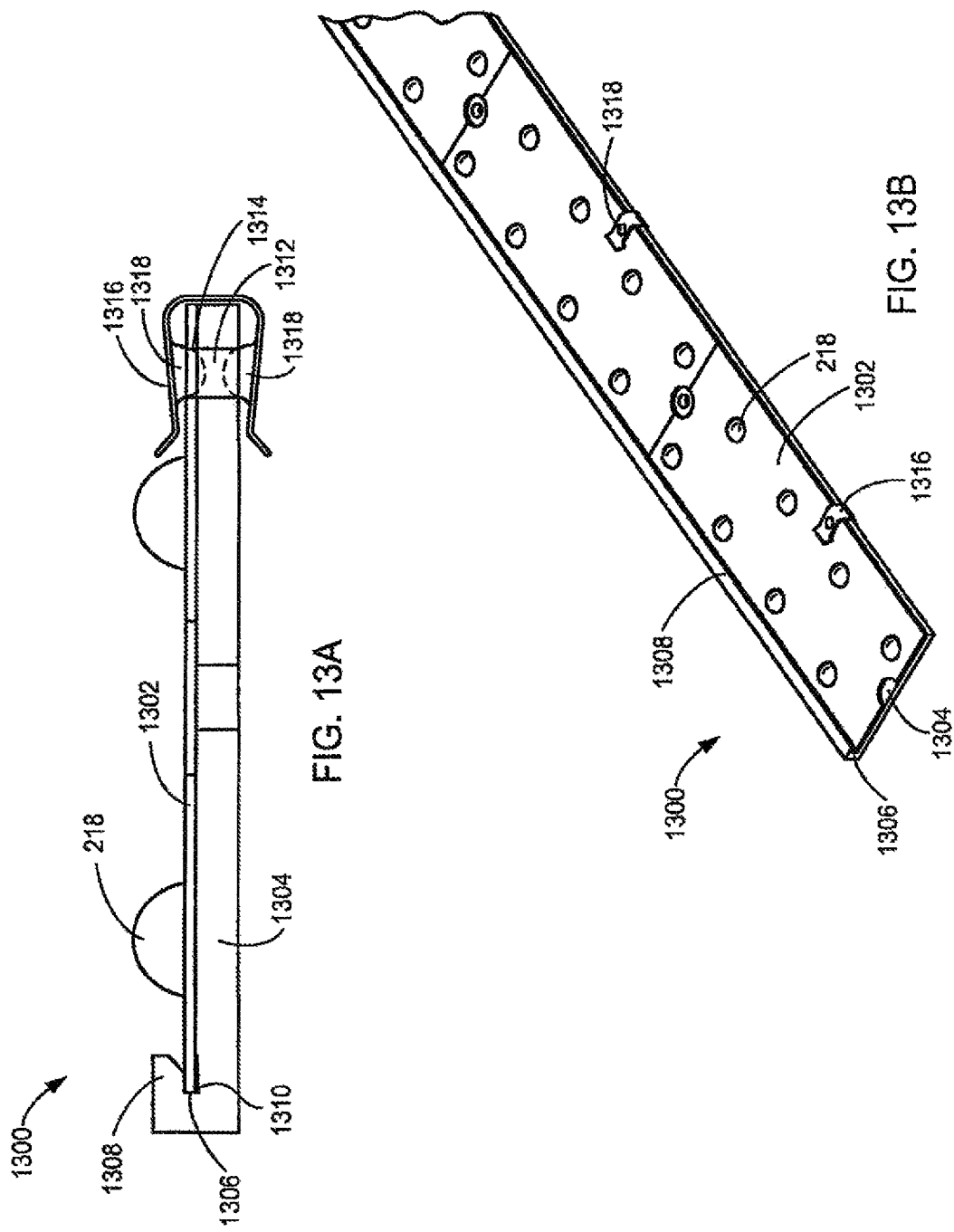

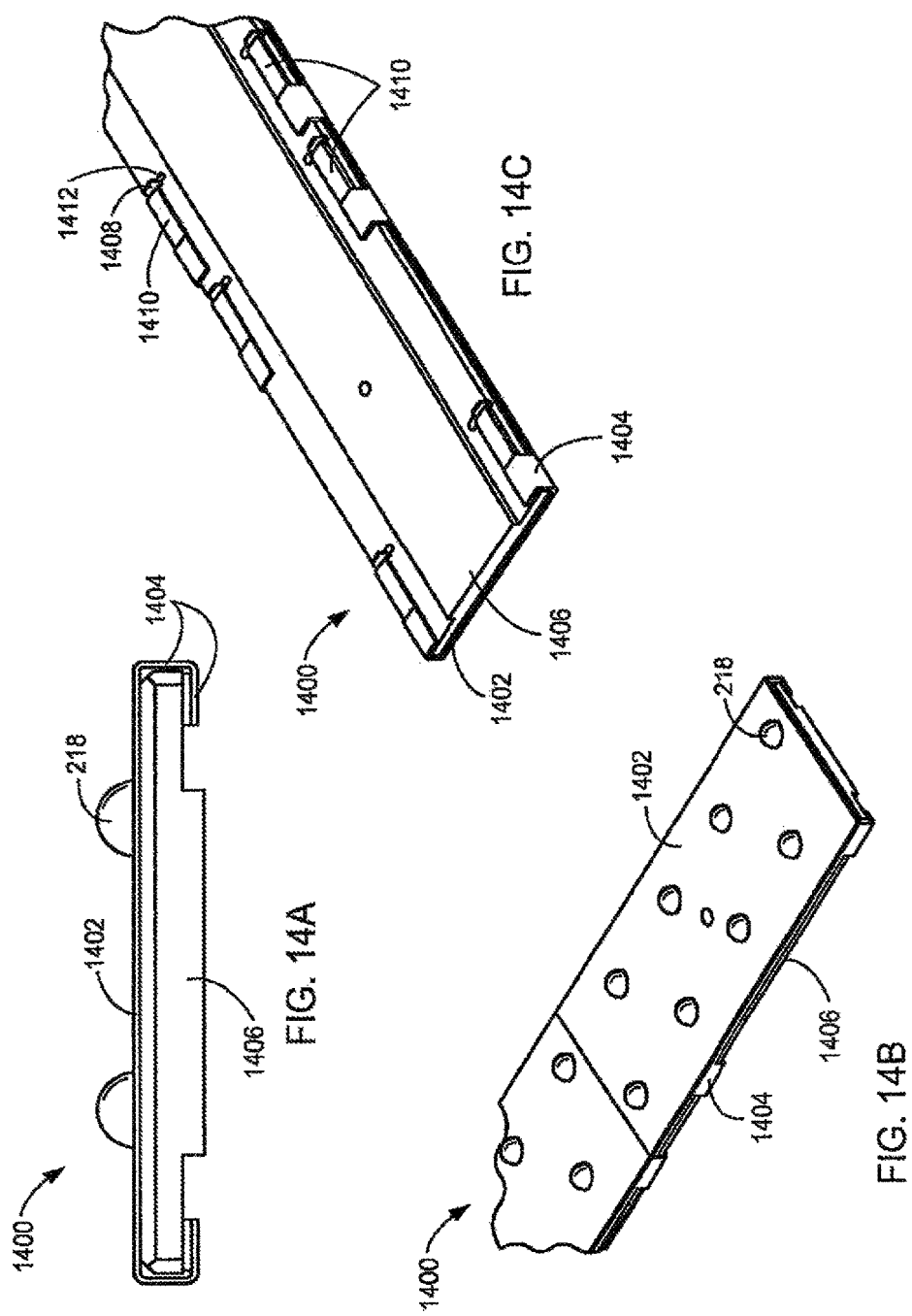

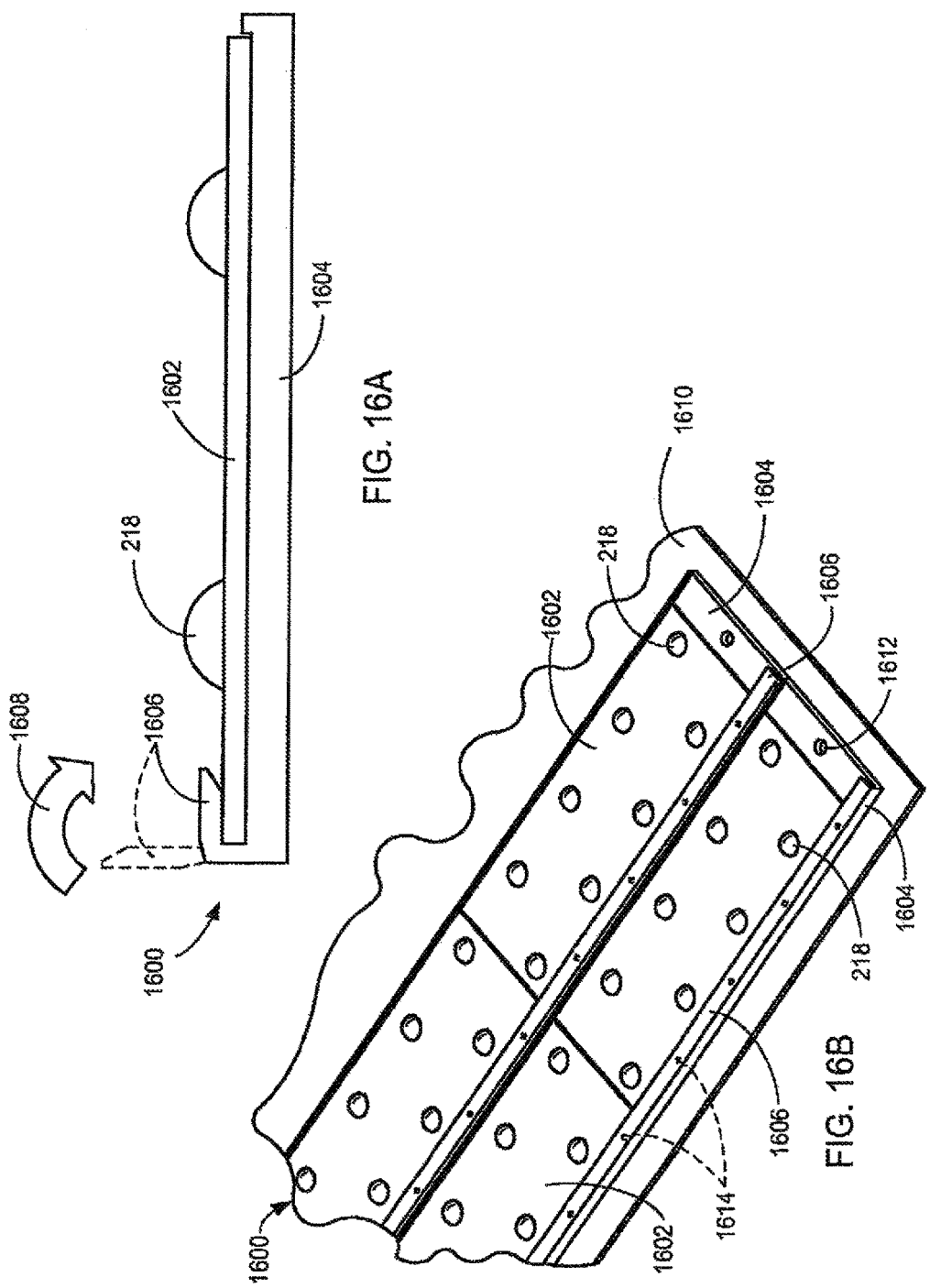

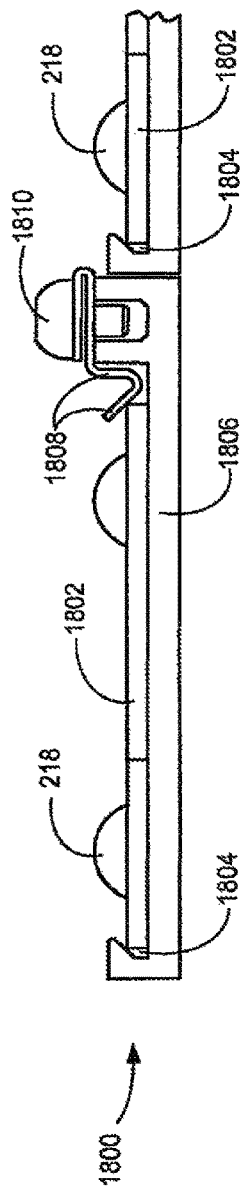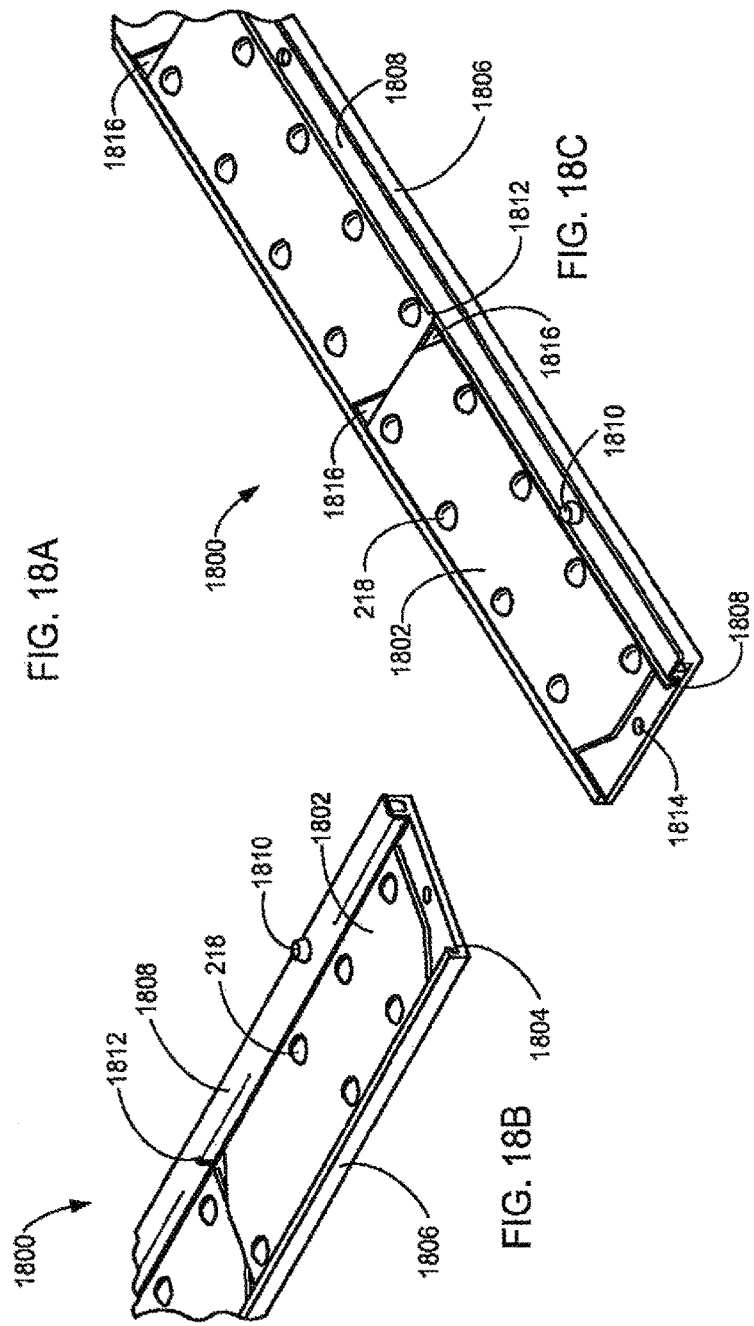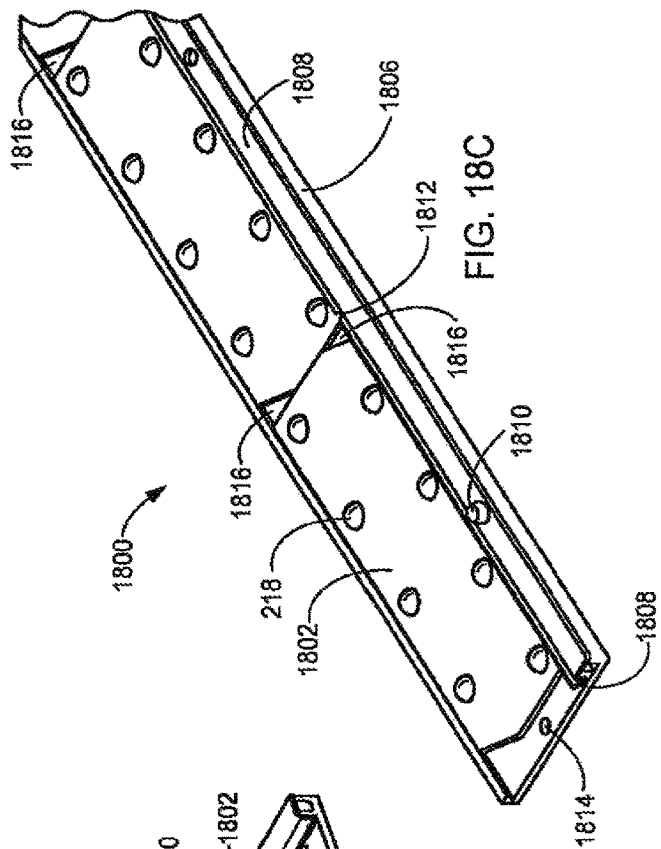

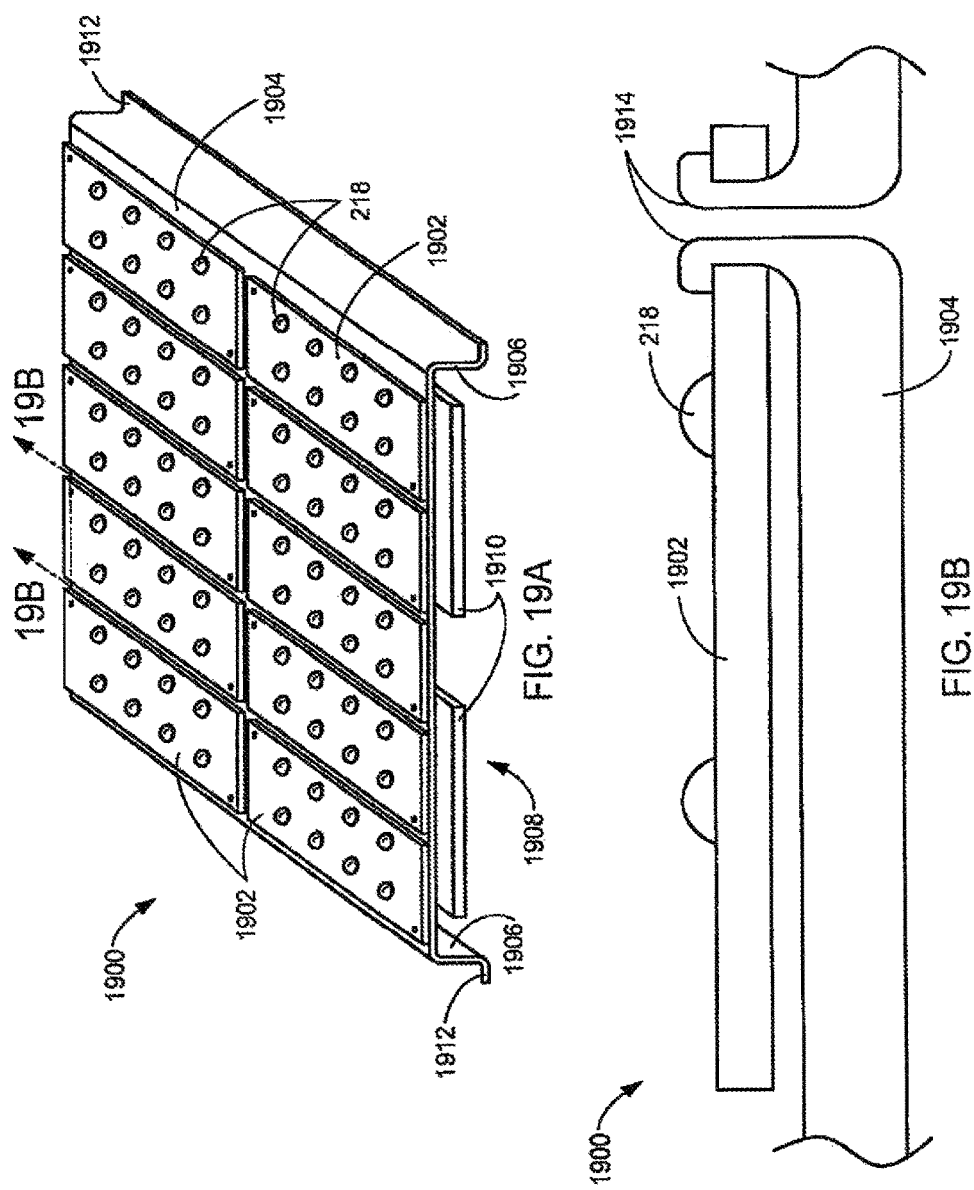

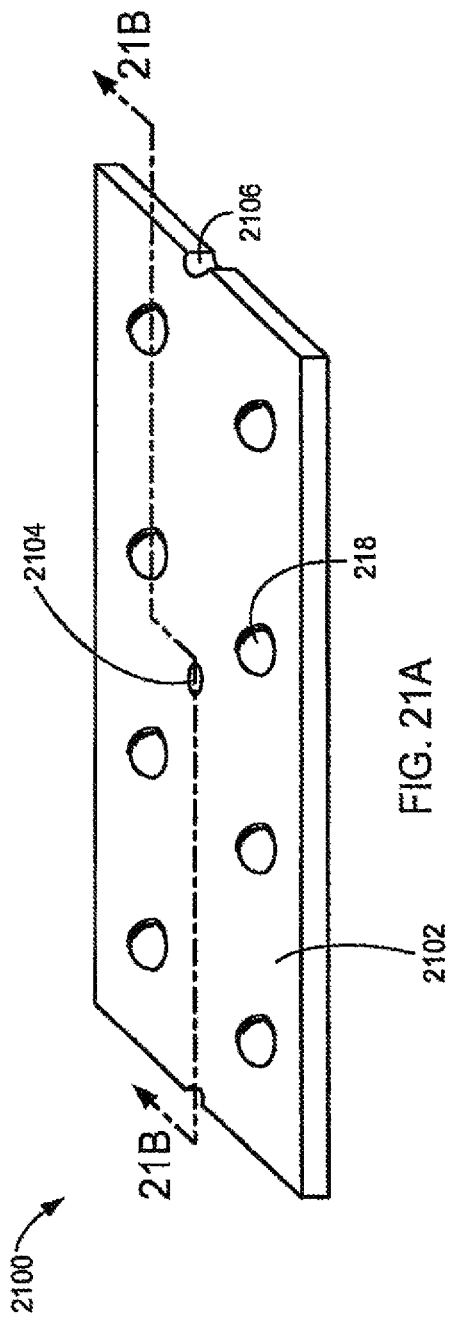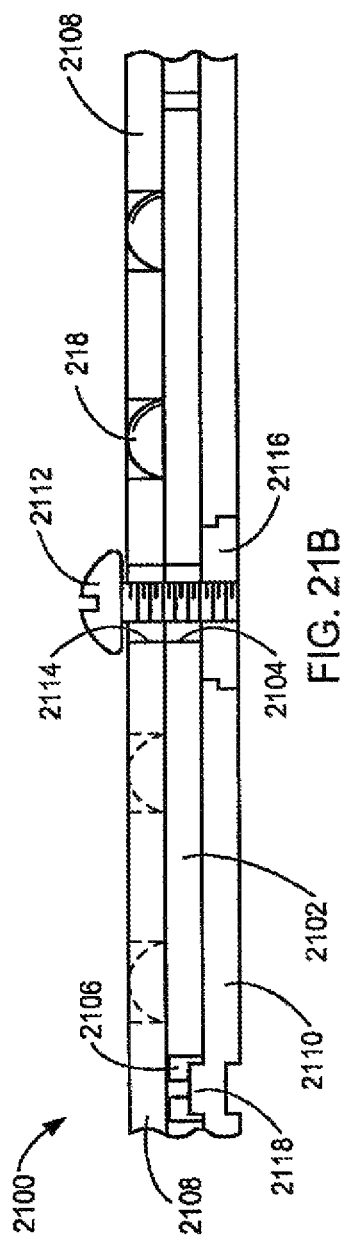

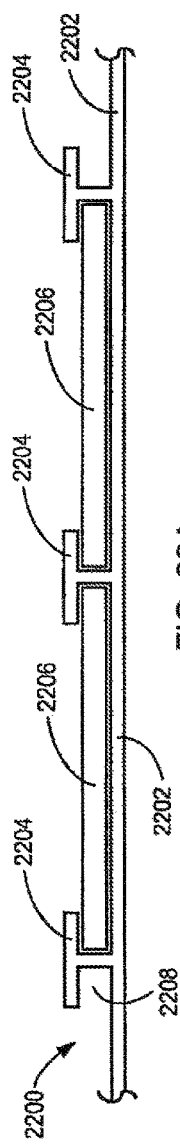
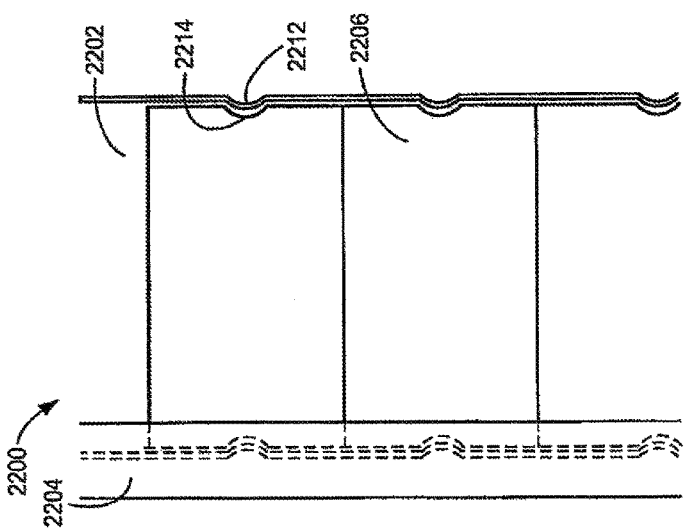

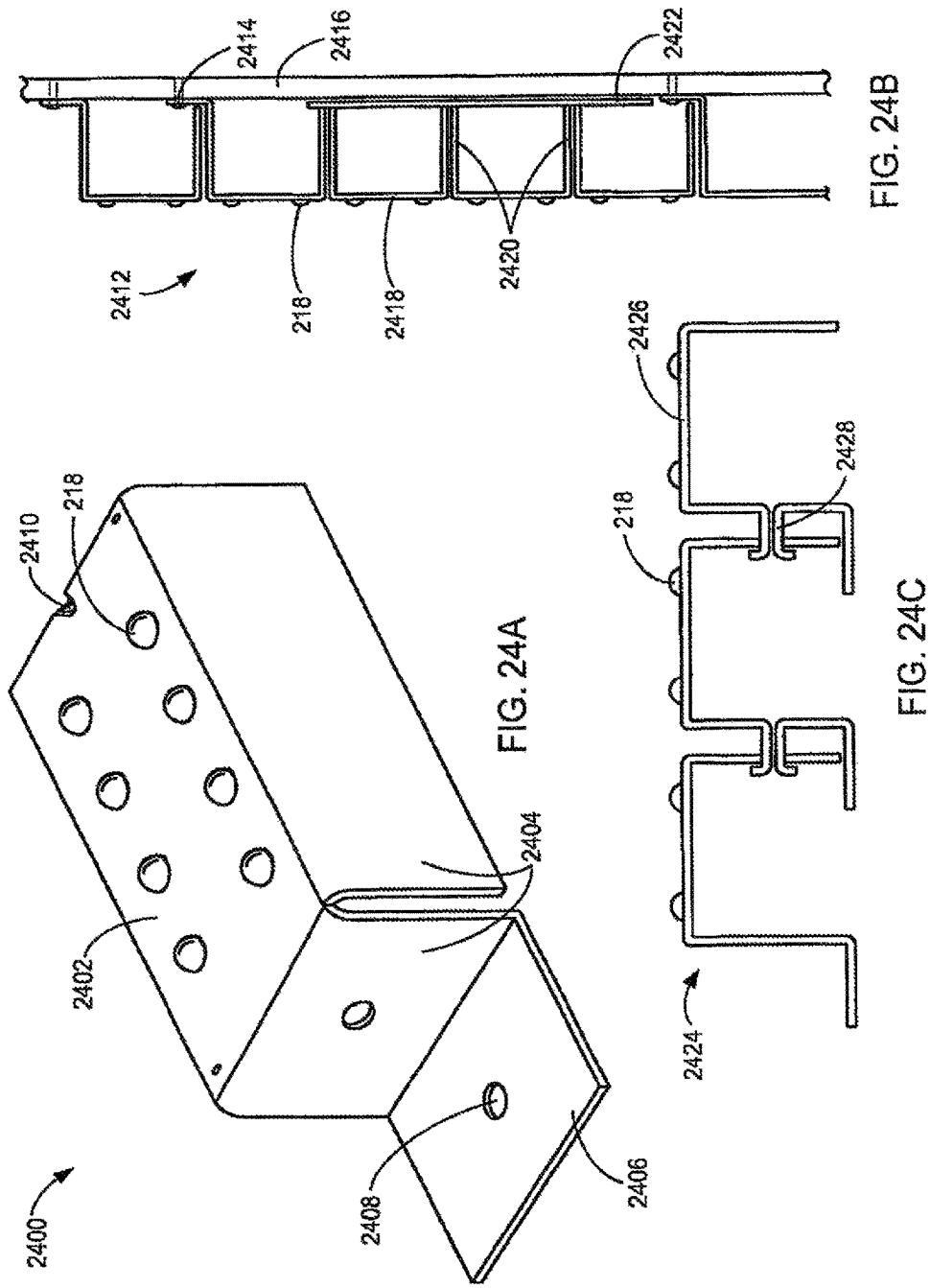

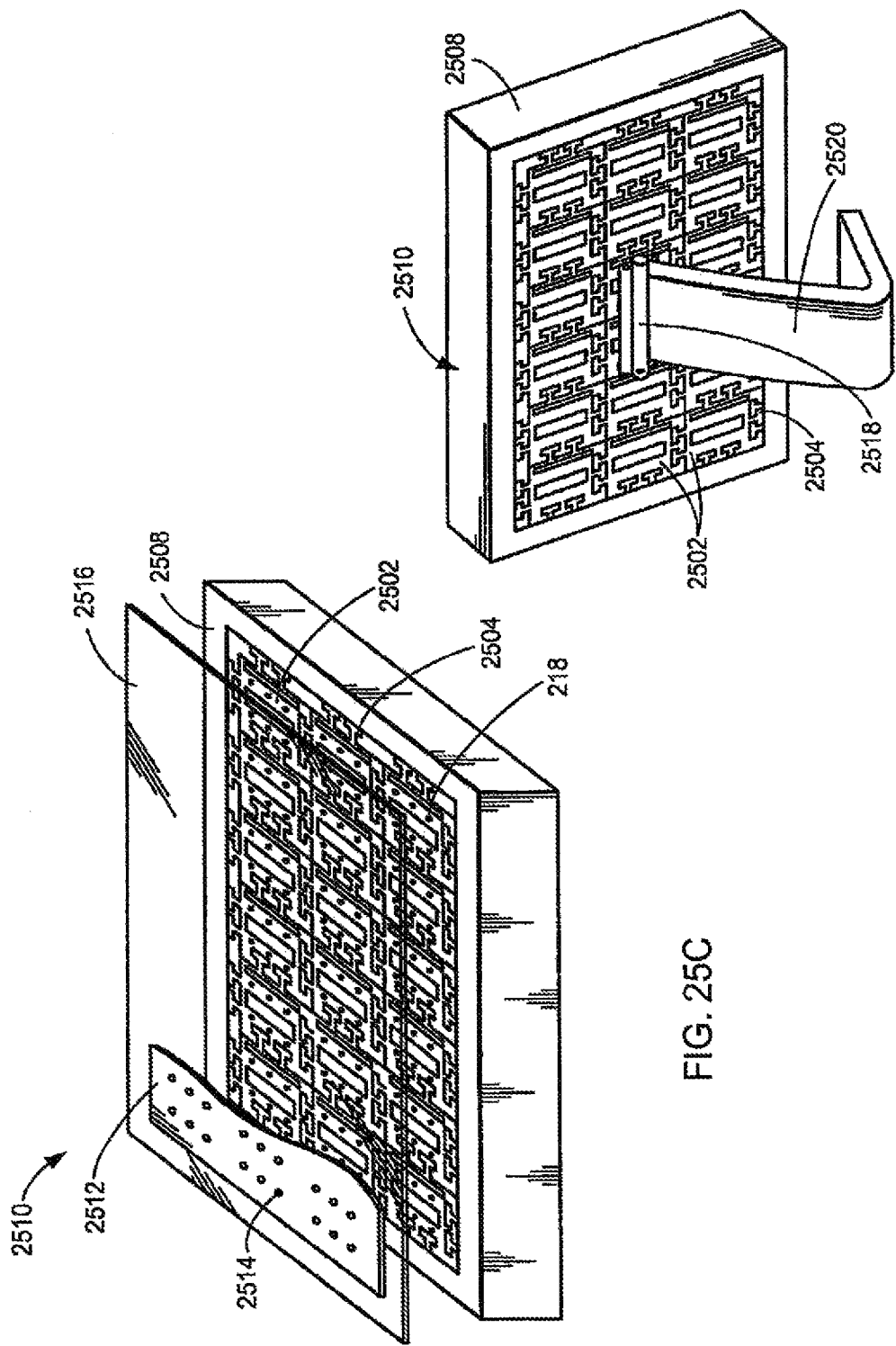

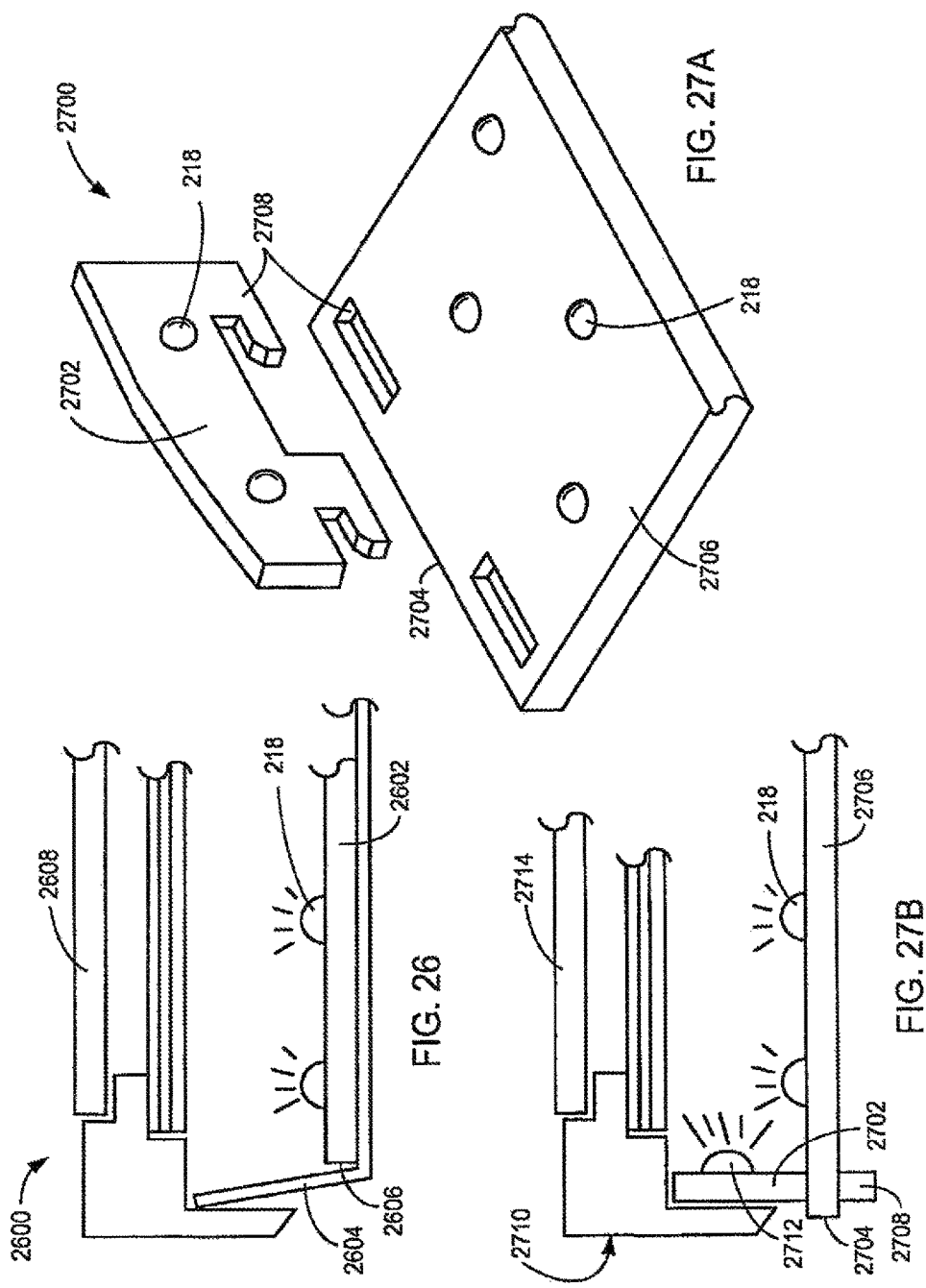

DISPLAY SYSTEM WITH DISTRIBUTED LED BACKLIGHT

This application is a continuation of U.S. patent application Ser. No. 13/359,308, filed Jan. 26, 2012, which is a continuation of U.S. patent application Ser. No. 12/237,331, filed Sep. 24, 2008, now U.S. Pat. No. 8,104,911, which claims the benefit of U.S. provisional patent application No. 60/976,404, filed Sep. 28, 2007. This application claims the benefit of and claims priority to U.S. patent application Ser. No. 13/359,308, filed Jan. 26, 2012, U.S. patent application Ser. No. 12/237,331, filed Sep. 24, 2008, now U.S. Pat. No. 8,104,911, and U.S. provisional patent application No. 60/976,404, filed Sep. 28, 2007, each of which are hereby incorporated by reference herein in their entireties.

TECHNICAL FIELD

The present invention relates generally to display systems, and more particularly to a display system with a distributed LED backlight.

BACKGROUND

With the advance of display systems illumination technology from incandescent to fluorescent to solid-state light sources, and with ever-increasing miniaturization, one popular electronic category seems not to have kept pace. That category is large-sized personal data displays, such as personal computer monitors.

For many years, such monitors were based on cathode ray tube ("CRT") technology. More recently, flat panel displays have increasingly displaced CRT displays. The most common form of flat panel displays utilizes one or more fluorescent light sources located behind a liquid crystal display ("LCD") screen. Contemporary technology has enabled the use of cold cathode fluorescent light ("CCFL") light sources, but because a cathode emitter is still required, a high voltage source for striking and maintaining an electric arc through the CCFL is also required.

With continuing improvements in light-emitting diode ("LED") technology, such as substantial improvements in brightness, energy efficiency, color range, life expectancy, durability, robustness, and continual reductions in cost, LEDs have increasingly been of interest for superseding CCFLs in larger computer displays. Indeed, LEDs have already been widely adopted as the preferred light source in smaller display devices, such as those found on portable cellular telephones, personal data assistants ("PDAs"), personal music devices (such as Apple Inc.'s iPod®), and so forth.

One reason for preferring LED light sources to CCFL backlight light sources is the substantially larger color gamma that can be provided by LED light sources. Typically, an LCD display that is illuminated by a CCFL backlight produces about 72-74 percent of the color gamma of a CRT-based NTSC display. ("NTSC" is the analog television system in use in Canada, Japan, South Korea, the Philippines, the United States, and some other countries.) Current LED backlight display technology, however, has the potential of producing 104-118 percent or more of that gamma color space.

Another reason for not preferring CCFL bulbs is that they contain environmentally unfriendly mercury, which could be advantageously eliminated if an acceptable LED backlight light source configuration could be developed for larger displays.

When implemented in small displays such as just described, the technical requirements are readily met. As is known in the art, the illumination intensity can be rendered uniform by distributing LED light sources around the periphery of the display and utilizing light diffusing layers behind the display to equalize the display intensity. The technical challenges are modest because the screens are modest in size, so that the individual display pixels are never very far from one or more of the LED light sources. Light attenuation caused by distance from the LED light sources is therefore not great and is readily equalized by appropriate LED positioning coupled with suitable light diffusers behind the display.

One way to envision the ease with which this challenge can be met in smaller displays is to consider the number of pixels, on average, that each LED light source must support in the display, and the maximum distances per pixel that the most distant pixels are located relative to a given LED light source. These numbers are modest (perhaps in the hundreds), so the light diminution or attenuation for the most distant pixels is similarly modest and readily compensated by suitable diffuser designs.

On the other hand, the larger geometries of typical flat panel computer monitors and displays (e.g., larger than about 20 inches) create area-to-perimeter ratios that have proven untenable for current LED technologies, particularly with respect to LED brightness or light output. This has meant that it has proven unsatisfactory to attempt to replace CCFL light sources with LED light sources along one or more edges of such larger display screens. Accordingly, such displays continue to employ CCFL light sources even though CCFL light sources are increasingly less desirable than LED light sources.

It would seem that a straightforward solution for replacing CCFL light sources with LEDs would then be to arrange the LEDs in some sort of array configuration behind the LCD display screen, rather than around the perimeter. Prior attempts to do so, however, have proven unsatisfactory. Commercially viable displays for general consumption must be economical to manufacture, thin, lightweight, and must provide efficient thermal management capability. Attempts to meet these criteria in acceptable form factors and costs have been unsuccessful.

Previous efforts to achieve these objectives have failed due to a number of practical obstacles. For example, even though LED light outputs have dramatically improved in recent years, a very large number of LEDs is still required to provide sufficient brightness in such larger displays. Typically, a minimum of several hundred LEDs must be used. This then requires an enormously large maze of wires and/or bulky circuit boards to mount, support, and power such a large number of LEDs in a distributed matrix configuration. This in turn requires adequate mechanical structure to support all those components behind the LED screen. The resulting structure is bulky, thick, heavy, and not well suited for managing and removing the heat that is generated by the LEDs and the underlying electrical circuitry. It is also expensive and not well suited for efficient manufacturing.

Another challenge with utilizing LEDs in large arrays is maintaining uniformity of color in the large numbers of LEDs. The color balance and spectra of the LEDs is limited by the phosphorescence. For example, white LEDs are often actually blue LEDs with a complementary phosphor dot on the front of the LED. Depending upon manufacturing precision (and thus, related manufacturing costs), actual colors may vary from, for example, slightly blue to slightly pink. Understandably, reducing or compensating for such variability increases cost and complexity significantly as the number of LEDs increases in larger display configurations and environments.

The color and the output of each LED also depend fairly sensitively on temperature. The difficulties in providing proper thermal management capability can readily lead to temperature variations across the distributed array of LED light sources. Since the color qualities of LED light sources are sensitively dependent upon their operating temperatures, such non-uniformities lead to unacceptable variations in color from one portion of the display to another.

Additionally, it would be highly desirable to provide an LED light solution for large displays that is adaptable and compliant with existing overall CCFL-based display system configurations and form factors, so that the largest number of components (e.g., LCD screens, color diffusers, filters, housings, and so forth) can continue to be utilized without the need for major redesigns and production modifications.

As a result, prior efforts to replace CCFL light sources with LEDs in commercial consumer applications have largely failed to move beyond the prototype stage. The complexities, manufacturing costs, bulkiness, very heavy weights, color non-uniformities, thermal management challenges, and so forth, have simply combined in such a way as to leave experts in the technology convinced that they must yet await the development of even significantly brighter, more uniform, and less expensive LEDs.

Consumers expect and demand an excellent, consistent, and affordable consumer experience. Prior attempts to utilize LEDs in large displays have thus not solved the problem of building displays that are light yet rigid, thin, easy and inexpensive to manufacture, uniform in color, low in cost, and that also provide the excellent overall high quality user experience that customers demand and expect.

Thus, a need still remains for an improved system for a large LED backlight. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The present invention provides a display system with a distributed LED backlight including: providing a plurality of tile LED light sources, each tile LED light source having a tile and a plurality of similar LED light sources on each tile connected for emitting light therefrom; orienting the plurality of tile LED light sources for illuminating a display from the back of the display; and integrating the plurality of tile LED light sources into a thermally and mechanically structurally integrated distributed LED tile matrix backlight light source.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 9D is an isometric view of another embodiment having overlapping tiles;

FIG. 9E is a side view of additional overlapping tiles connected according to the embodiment of FIG. 9D;

FIG. 9F is a side view of an embodiment in which overlapping tiles overlap by being tilted;

FIG. 10A is a fragmentary isometric view of an embodiment having snap-together tiles that are snapped together into rows;

FIG. 10B is an inverted detail view of the snap-together system for the tiles shown in FIG. 10A;

FIG. 11A is an isometric view of an embodiment having tiles configured with side bends;

FIG. 11B is an inverted fragmentary view of tiles like those in FIG. 11A, aligned for attachment to one another;

FIG. 12A is an end view of an embodiment having tiles attached in rows to rails;

FIG. 12B is a fragmentary isometric view of an open frame to which the rails shown in FIG. 12A are attached in overlapping fashion;

FIG. 13A is an end view of another embodiment having tiles attached in rows to rails;

FIG. 13B is a fragmentary isometric view of a portion of the embodiment of FIG. 13A;

FIG. 14A is an end view of an embodiment in which tiles have tile arms bent in a "U" shape around the sides of a T-rail;

FIG. 14B is a fragmentary isometric view of a portion of the embodiment of FIG. 14A;

FIG. 14C is an inverted view of the portion of the embodiment shown in FIG. 14B;

FIG. 16A is an end view of an embodiment in which tiles are held on a rail by a lip;

FIG. 16B is a fragmentary isometric view of rails of the embodiment of FIG. 16A attached to an array tray;

FIG. 18A is an end view of an embodiment in which tiles in a rail are engaged along one edge in a retaining channel and along the opposite edge by a spring retainer;

FIG. 18B is a fragmentary isometric view of the structure of FIG. 18A;

FIG. 18C is a view similar to that of FIG. 18B rotated clockwise approximately 90 degrees;

FIG. 19A is an isometric view of an embodiment in which tiles are attached directly to an array tray for additional combined structural strength and integrity;

FIG. 19B is an enlarged cross-sectional view of a portion of the embodiment of FIG. 19A, taken generally on line 19B-19B therein;

FIG. 21A is an isometric view of an embodiment adapted for inclusion in a sandwich type of structure;

FIG. 21B is a cross-sectional view of the structure illustrated in FIG. 21A, taken on line 21B-21B in FIG. 21A, and in which the tile is sandwiched between an upper plate and a lower plate;

FIG. 22A is an end view of an embodiment having an extruded tray with "T" cross bars on the top surface;

FIG. 22B is an isometric view of a portion of the embodiment of FIG. 22A with the addition of stops on the ends thereof;

FIG. 22C is a figurative top view of an alternative configuration for holding tiles in place on the extruded tray shown in FIGS. 22A and 22B;

FIG. 24A is an isometric view of another embodiment in which the tiles are self-supporting;

FIG. 24B is a side view of an embodiment similar to the embodiment of FIG. 24A;

FIG. 24C is a side view of another embodiment similar to the embodiments of FIGS. 24A and 24B;

FIG. 25C is a partially exploded, fragmentary, isometric view of a display utilizing the structure of FIG. 25B, in which tiles have been press-fit together to form a three-dimensional structural plate and then incorporated into a frame;

FIG. 25D is a rear isometric view of the display of FIG. 25C attached by a pivot to a support arm stand assembly;

FIG. 26 is a fragmentary side cross-sectional view of an embodiment in which an edge reflector provides LED edge lighting;

FIG. 27A is a fragmentary isometric exploded view of an embodiment in which an additional LED light bank provides LED edge lighting;

FIG. 27B is a fragmentary side cross-sectional view of the structure of FIG. 27A assembled into a display.

DETAILED DESCRIPTION

Figure 1:
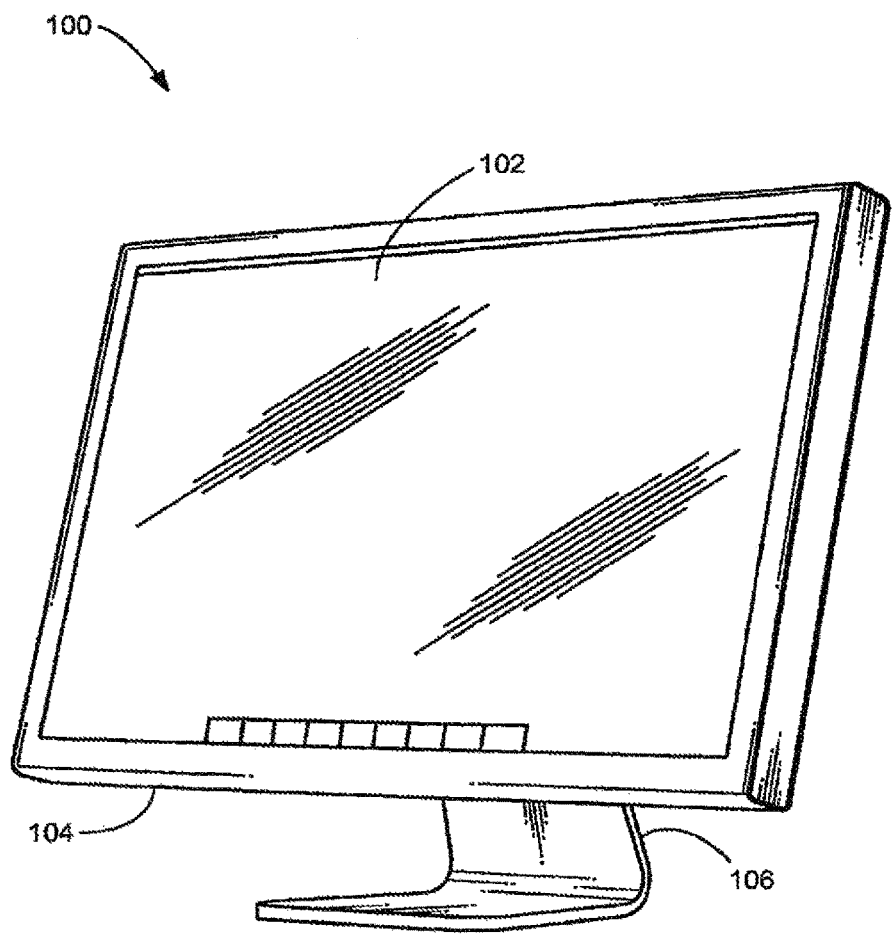
FIG. 1 is a perspective view of a display system in accordance with an embodiment of the invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Similarly, the drawings showing embodiments of the system are semi-diagrammatic and not to scale and, particularly, some of the dimensions are for the clarity of presentation and are exaggerated in the drawing FIGs. Likewise, although the views in the drawings for ease of description generally show similar orientations, this depiction in the FIGs. is arbitrary for the most part. Generally, the invention can be considered, understood, and operated in any orientation.

In addition, where multiple embodiments are disclosed and described having some features in common, for clarity and ease of illustration, description, and comprehension thereof, similar and like features one to another will ordinarily be described with like reference numerals.

For expository purposes, terms, such as "above", "below", "bottom", "top", "side" (as in "sidewall"), "higher", "lower", "upper", "over", and "under", are defined with respect to the back of the display device except where the context indicates a different sense. The term "on" means that there is direct contact among elements.

The term "system" as used herein refers to and is defined as the method and as the apparatus of the present invention in accordance with the context in which the term is used.

With respect to the use of light-emitting diodes ("LEDs") rather than cold cathode fluorescent lights ("CCFLs"), an initial concern is thermal management. Normally, LEDs are mounted on a conventional printed circuit board ("PCB"). PCB configurations are convenient, easily configurable, and economical, but they have bad thermal properties because they do not conduct heat very well, and they exhibit mismatches in coefficient of thermal expansion ("CTE") factors, causing reliability issues and making them unsuitable for large array LED configurations. Metallic substrates can provide excellent thermal performance, equalizing temperatures and conducting heat rapidly away from the LEDs. However, due to the cost, complexity, and difficulty of solving the problem of building large such arrays and of forming circuitry thereon, conductive metallic substrates have not been employed for large LED arrays.

One possible solution for using a PCB substrate is to bond it tightly to a thermally conductive layer, such as by attaching a thermally conductive graphite layer to the PCB substrate with thermally conductive (e.g., copper ("Cu")) rivets. However, when scaled up to large displays (e.g., displays larger than conventional 20-inch computer monitors), the size and complexity of those displays (containing, for example, over 1000 LEDs) become unwieldy and uneconomical.

As explained herein, the present invention solves these problems by providing a display system that combines and utilizes a number of tile LED light sources. As used herein, the terms "tile" and "tile LED light source" are defined, according to the context in which used, to mean an assembly, formed integrally on a thermally conductive substrate, with at least two similar or substantially matching LED light sources physically mounted and electrically connected thereon and configured for emitting light therefrom, and with fewer than the total number of LED light sources utilized by the display system into which the tile is incorporated. When used with the term "tile", the term "thermally conductive" is defined to mean having thermal conduction properties comparable to or better than those of metal.

In one embodiment, each tile is formed of a metallic substrate with eight similar or matching LED light sources thereon, each LED light source emitting visible white light. Various display system backlight configurations are then described having a variety of optimizations for attaining co-planarity of the tiles, uniform heat management, weight minimization, efficient manufacturability, economical serviceability, stiffness in various directions, performance efficiency, reduced number of components, efficient assembly operations, optimized assembly geometries, reduced complexity, torsional rigidity, reduced thickness, optimized thermal mechanical outcomes, efficiencies in functional dependencies, creation and maximization of heat exchange surface area for higher massflow and lower velocity air convection (either natural or forced), and so forth, according to the sizes and application environments in which particular such configurations and solutions may be employed.

Referring now to FIG. 1, therein is shown a perspective view of a display system 100 having a display assembly 102 supported in a frame 104. In turn; the frame 104 is supported on a stand 106. The display system 100 has a distributed LED backlight (not shown, but see the backlight unit 220 in FIG. 2). As used herein, the term "backlight" is defined to mean a form of illumination that provides light for a display that illuminates the display from the back of the display. This definition means that the light is presented to the side of the display opposite the side of the display that is viewed, such that the light is shining through the display toward the viewer rather than reflecting toward the viewer from the front side of the display. As used herein, the term "distributed" is defined to mean that the LED light sources of the LED backlight are positioned across and within the display area of the display assembly 102, and not just around the periphery thereof adjacent the front bezel (e.g., the front bezel 202 in FIG. 2).

Figure 2:
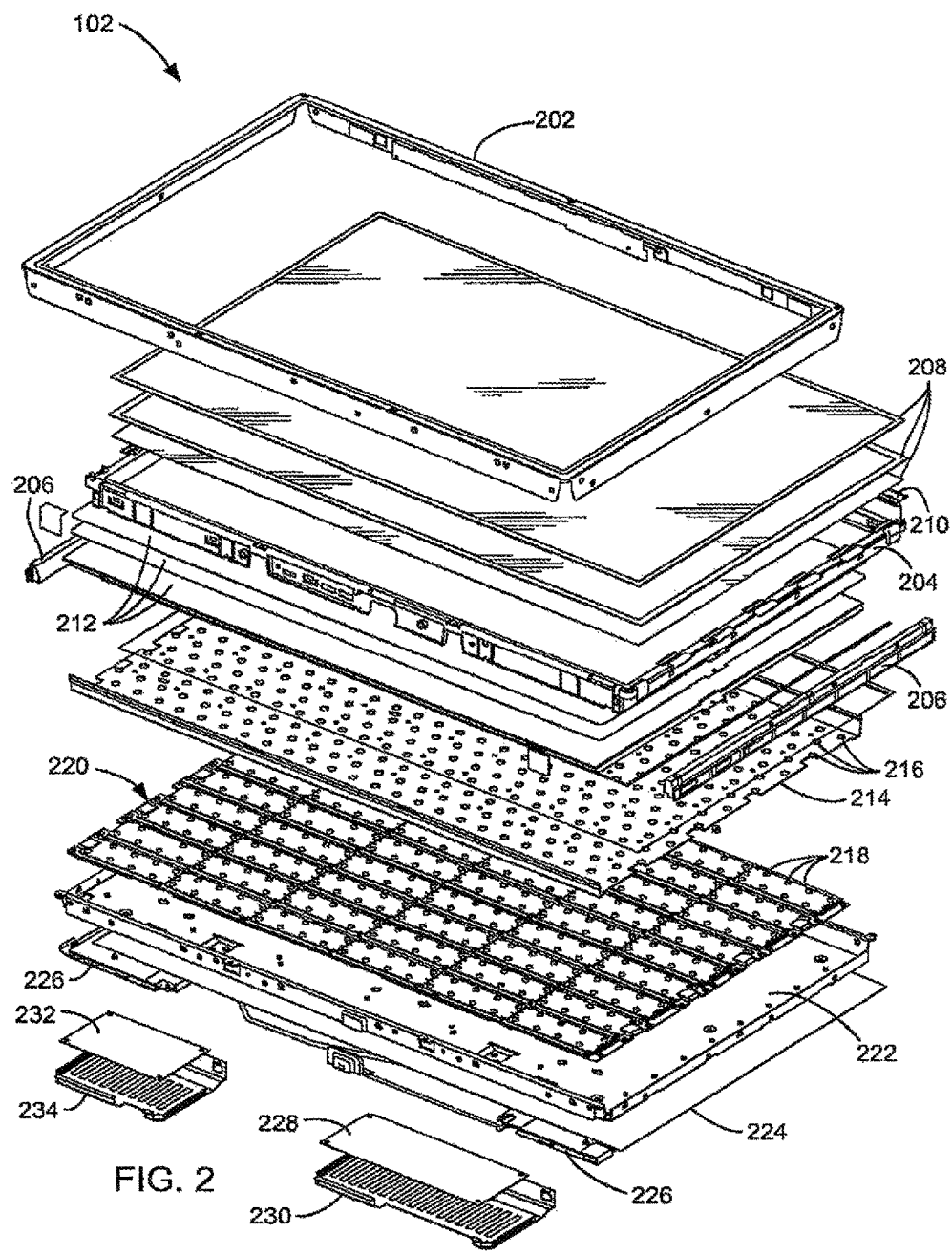
FIG. 2 is an exploded, isometric view of major components of the display system of FIG. 1.

Referring now to FIG. 2, therein is shown an exploded, isometric view of the majority of the major components of the display assembly 102. The frame 104 (FIG. 1) includes a front bezel 202, a panel frame 204, and panel side rails 206.

The display assembly 102 also includes a liquid crystal display ("LCD") sub-assembly 208 that connects to LCD circuitry 210. In one embodiment, the LCD sub-assembly 208 utilizes thin film transistor ("TFT") technology to form a TFT LCD display, as is known in the art.

Beneath the LCD sub-assembly 208 are backlight diffuser sheets 212, beneath which is a reflector 214 having holes 216 therein that receive LEDs 218 on a backlight unit 220. The reflector 214 is thus positioned around the LEDs 218. The LEDs 218 are oriented forwardly toward the LCD sub-assembly 208 for illuminating the display assembly 102 from the back of the display.

The backlight unit 220 is physically and thermally attached to an array tray 222. A heat spreader 224, such as a graphite sheet, is attached to the back of the array tray 222 opposite the backlight unit 220 to conduct heat rapidly away therefrom and to equalize temperatures throughout the backlight unit 220. By connecting directly to the array tray 222 to which the backlight unit 220 is physically and thermally attached, the heat spreader 224 thermally integrates therewith, including with the tiles (see the tiles 404 in FIG. 4) in the backlight unit 220.

Beneath the heat spreader 224 are two LED driver circuit boards 226, one on either side of the display assembly 102. Beneath one of the LED driver circuit boards 226, toward one side of the display assembly 102, is an LCD controller power control board 228 that is protected by an LCD controller shield 230 therebeneath. An LED power supply 232 is attached beneath the other LED driver circuit board 226 on the other side of the display assembly 102, opposite the LCD controller power control board 228. An LED power supply insulator 234 protects the LED power supply 232.

Figure 3:
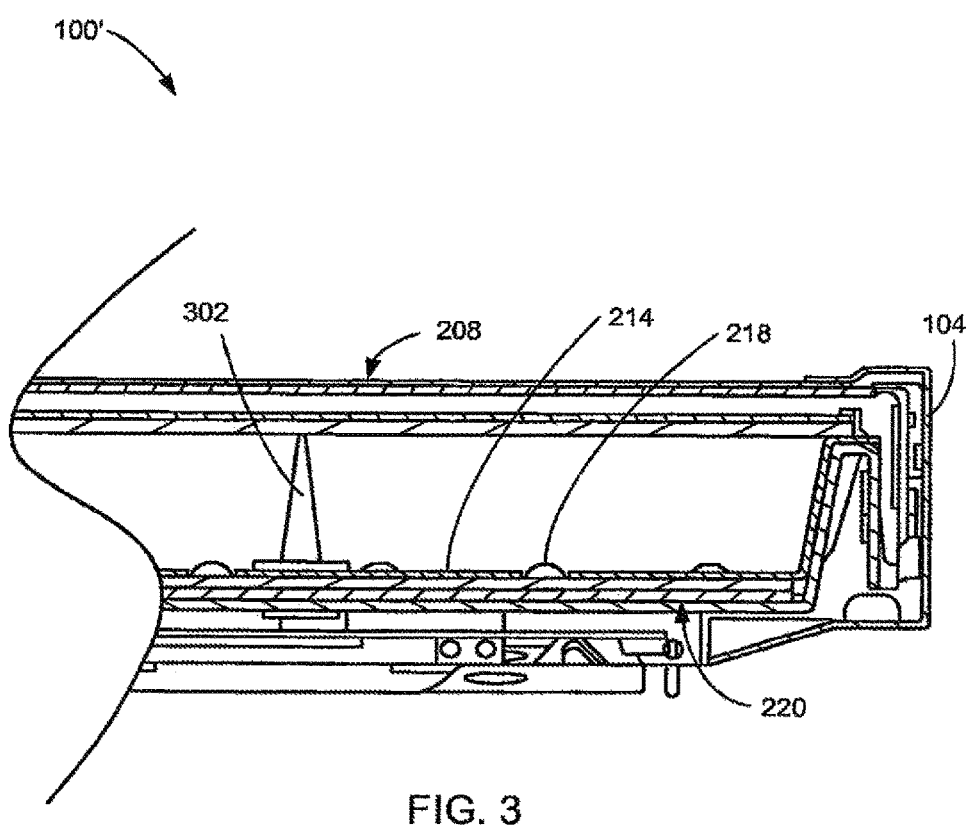
FIG. 3 is a fragmentary cross-sectional view of a display system embodiment similar to the embodiment shown in FIG. 1.

Referring now to FIG. 3, therein is shown a fragmentary cross-sectional view of an embodiment of a display system 100' similar to the display system 100 (FIG. 1). To aid in producing uniform illumination of the LCD sub-assembly 208, the backlight unit 220 is spaced from the LCD sub-assembly 208 by spacers 302.

Figure 4:
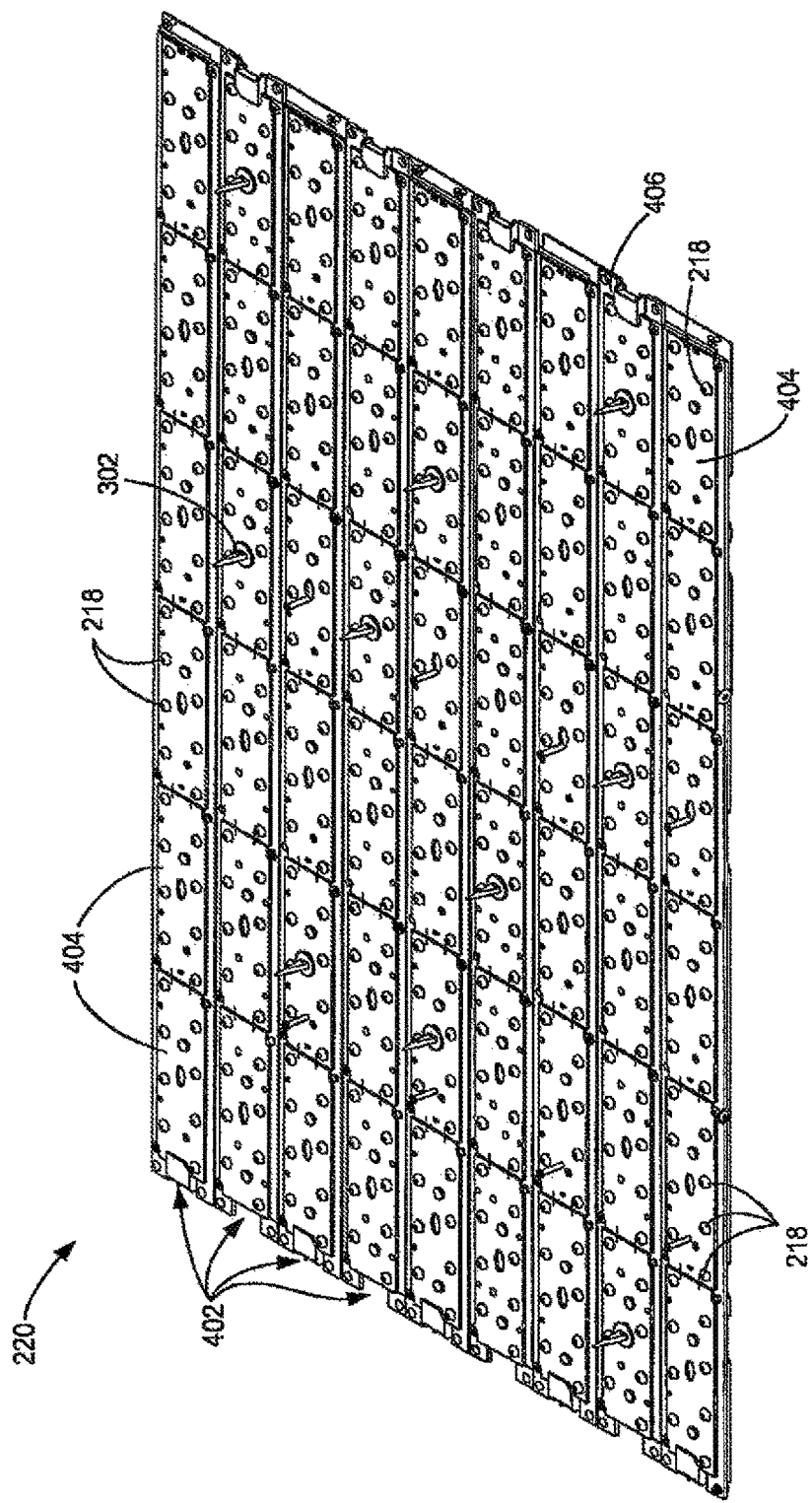
FIG. 4 is a larger isometric view of the backlight unit shown in FIG. 2.

Referring now to FIG. 4, therein is shown a larger isometric view of the backlight unit 220. The backlight unit 220 is formed of a series of tile bars 402 arranged adjacent and parallel to each other. Each tile bar 402 is formed of a number of tiles 404 attached in a series on top of a tile bar rail 406.

Figure 5:
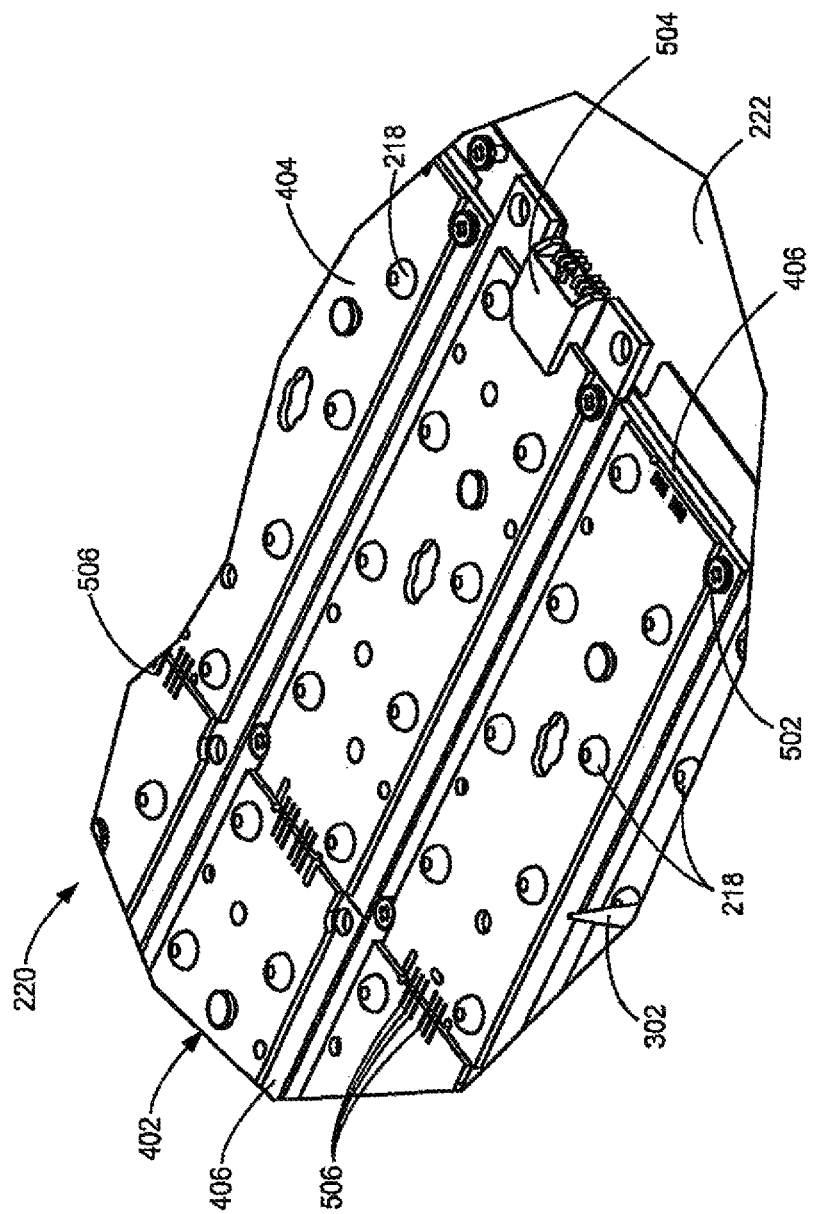
FIG. 5 is an enlarged fragmentary isometric view of a portion of the backlight unit shown in FIG. 4.

Referring now to FIG. 5, therein is shown an enlarged fragmentary isometric view of a portion of the backlight unit 220 assembled onto the array tray 222 and attached thereto by screws 502. The tile bars 402 are arranged in alternating positions (as also shown in FIG. 4), with one end of each tile bar 402 being provided with an electrical connector 504.

The electrical connectors 504 are connected directly to the tiles 404 thereadjacent. Electrical power for the remaining tiles 404, in a respective tile bar 402, is provided by wire bonds 506 that electrically connect adjacent tiles by jumping from tile to tile along the respective tile bars 402 to connect through-conductors (not shown) that are formed in each tile 404.

The tiles 404 themselves are individual structures that physically and electrically support and interconnect the LEDs 218 the same surface of the tile 404. Further, as indicated, in one embodiment, as shown, the tiles 404 also provide electrical continuity for connecting to and providing power to adjacent tiles, such as by means of the wire bonds 506.

Also, the LEDs 218, which in one embodiment, as illustrated, are provided eight per tile 404, are actually LED clusters in various embodiments. In such clusters, each of the LEDs 218 is actually a cluster of four discreet LEDs, one blue LED, one red LED, and two green LEDs. Each such cluster is encapsulated, for example, with silicone, and the individual discrete LEDs therein are then electrically driven to emit respective intensities that combine to provide white light from each such LED 218 cluster.

In other embodiments, other LED configurations may be utilized. For example, white only LEDs may be employed.

To provide for excellent thermal conductivity and performance, the tiles 404 are formed of aluminum ("Al") substrates on which there is a thin thermally conductive but electrically insulating layer. On the top of this electrically insulating layer, the LEDs and associated circuitry are formed, for example, by conventional semiconductor fabrication processes. This beneficially provides for excellent thermal performance, and enhances heat conduction into the support structures to which the tiles 404 are attached, such as the tile bars 402, and so forth. As used herein, therefore, the term "thermally structurally integrated" is defined to mean that the tiles are thermally conductive (not insulating) and actively contribute to their own heat removal in cooperation and combination with the physical support structure to which they are attached, such that the combination of the tiles and such support structure attains heat flow thereamong that is greater than would be attained using a tile having a substrate formed of a material having a lower heat conductivity than metal.

Additionally, by forming the tiles 404 in this manner with a metallic substrate, not only is excellent thermal performance achieved, but the tiles also have superior formability and machineability such that the tiles can be shaped, if desired, into complex configurations, as illustrated further herein.

Importantly, the tiles 404 are strong enough to become active structural elements, i.e., mechanical building blocks, that can be mechanically structurally integrated into integrated LED tile matrices rather than simply riding passively on an external supporting structure. That is, by integrating into and becoming part of their own structural support matrix, external support requirements can be substantially reduced, resulting in significant savings in weight, cost, display thickness, and so forth. As used herein, therefore, the term "mechanically structurally integrated" is defined to mean that the tiles actively contribute to their own physical support, and when attached to an additional physical support structure, that the tiles function in cooperation and combination therewith such that the combination of the tiles and such support structure is stronger and more rigid than the support structure alone. As used herein, the term "passively" is accordingly defined to mean: attaching tiles in a manner such that structural assistance and physical support is not effectively provided by the tiles.

According to the present invention and the particular embodiments under consideration, the tiles may be joined to one another in a self-supporting mechanically structurally integrated structure. Alternatively, the tiles may be mechanically structurally integrated with an additional support structure such that the additional support structure may be lighter in weight, thickness, and so forth, and less robust than would be necessary to support itself and the tiles were the tiles riding passively and not assisting in the structural support thereof. In other words, because of the mechanical structural integration with the tiles, such an additional support structure may be designed so that it is not strong enough to support itself and self-maintain its profile when burdened passively with the weight of a number of tile LED light sources. This is possible because the tile LED light sources are then actively combined and structurally integrated with and assist the additional support structure to help in providing support as well, so that together the integrated structure has sufficient strength and integrity to support the total combined weight.

It will be further understood based upon this disclosure that the tiles, as a result of their configurations, and where disclosed, their combinations with additional support structure, according to the particular embodiments, are integrated into three-dimensionally mechanically structurally integrated backlight light sources. This means that the integrated backlight light source structures provide enhanced strength, integrity, and rigidity in all three dimensions, and not just in a two dimensional planar sense.

Figure 6:
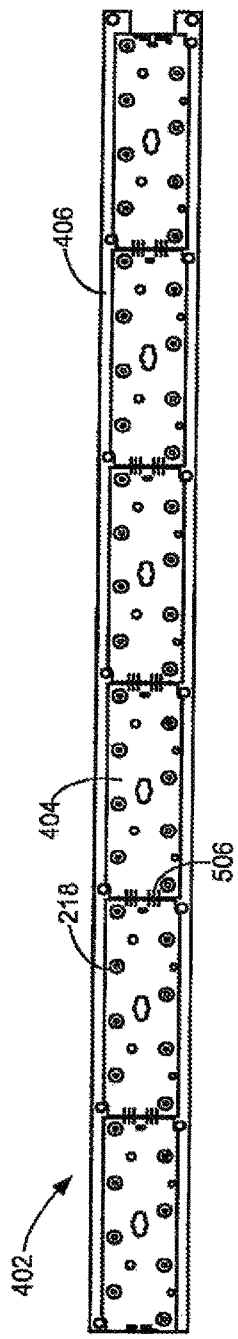
FIG. 6 is a top plane view of one of the tile bars in the backlight unit shown in FIG. 4.

Referring now to FIG. 6, therein is shown a top plane view of a tile bar 402.

Figure 7:
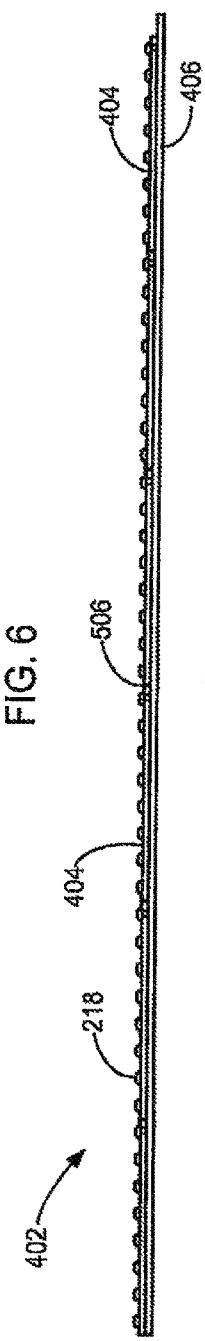
FIG. 7 is a side view of the tile bar shown in FIG. 6.

Referring now to FIG. 7, therein is shown a side view of the tile bar 402 shown in FIG. 6.

Figure 8B:
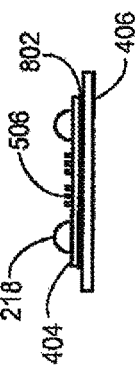
FIG. 8B is a cross-sectional view of the tile bar shown in FIG. 6, taken along line 8B-8B in FIG. 8A.
Figure 8A:
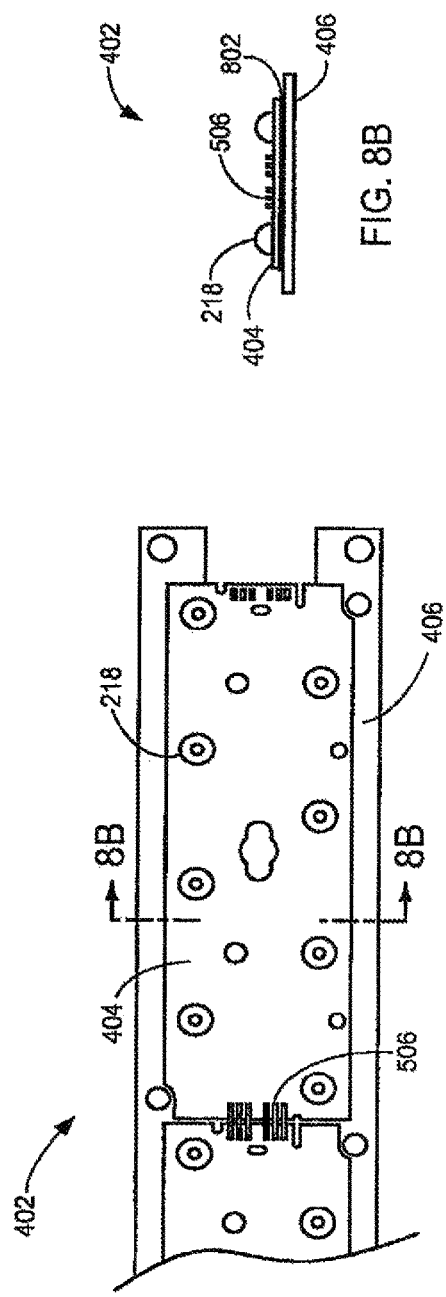
FIG. 8A is an enlarged top view of the right end of the tile bar shown in FIG. 6.

Referring now to FIG. 8A, therein is shown an enlarged top view of the right end of the tile bar 402 shown in FIG. 6.

Referring now to FIG. 8B, therein is shown a cross-sectional view of the tile bar 402 taken on line 8B-8B in FIG. 8A. A thermally conductive adhesive 802 adheres the tile 404 structurally to the tile bar rail 406 of the tile bar 402 such that the combined tile 404 and tile bar rail 406 are united into a unit that is stronger and more rigid than either the tile 404 or the tile bar rail 406 alone.

Figure 9A:
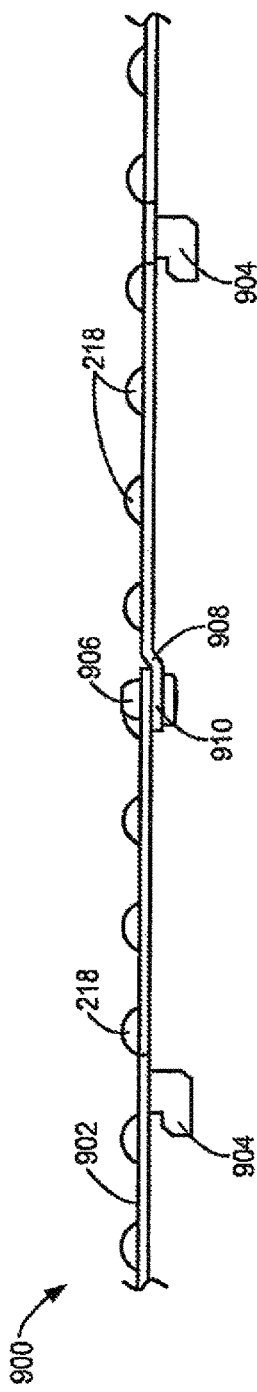
FIG. 9A is a side view of an embodiment of the invention showing overlapping tiles having drop-and-slide hooks.

Referring now to FIG. 9A, therein is shown a side view of an embodiment 900 of overlapping tiles 902 provided with drop-and-slide hooks 904. Adjacent overlapping tiles 902 may be attached to each other by screws 906, or by other appropriate attachments selected, for example, from rivets, clinch rivets, spot welds, line welds, screws, and a combination thereof.

To preserve co-planarity of the overlapping tiles 902, a drop jog 908 is provided on one end of each of the overlapping tiles 902. The drop jog 908 forms a jogged end 910 at the tile end, dropped sufficiently to slip underneath the tile next adjacent thereto while keeping the overlapping tiles 902 themselves flat and co-planar.

Figure 9B:
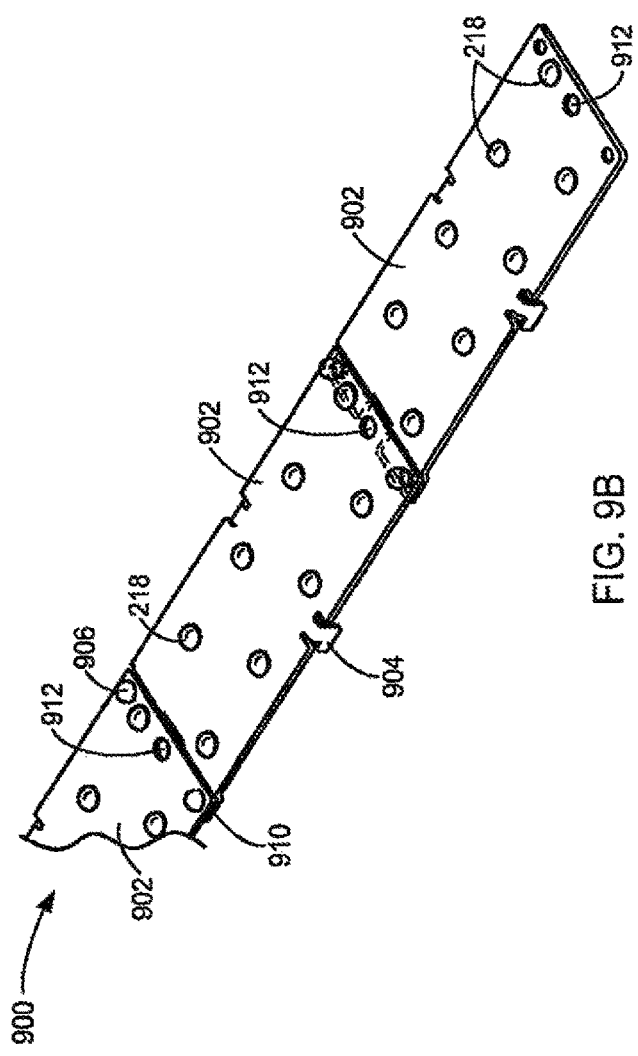
FIG. 9B is an isometric view of the embodiment of FIG. 9A.

Referring now to FIG. 9B, therein is shown an isometric view of the embodiment 900. In this embodiment, alignment holes 912 are provided through each end of the overlapping tiles 902. The alignment holes 912 provide a convenient mechanism for aligning the overlapping tiles 902 for assembly into rows, as illustrated. Such assembly can be easily accomplished, for example, by locating the alignment holes 912 onto pre-positioned pins (not shown) to hold the overlapping tiles 902 in position while the screws 906 are tightened. By this means, the tiles can be quickly and accurately aligned for assembly to each other.

It will also be readily understood by one of ordinary skill in the art, based upon the teachings in the present disclosure, that other suitable fasteners and/or attachments may be employed, as desired or appropriate, in place of the screws 906. Such attachments would include, for example, rivets, clinch rivets, spot welds, line welds, and the like, and may be utilized as appropriate with any of the tile configurations disclosed herein.

Figure 9C:
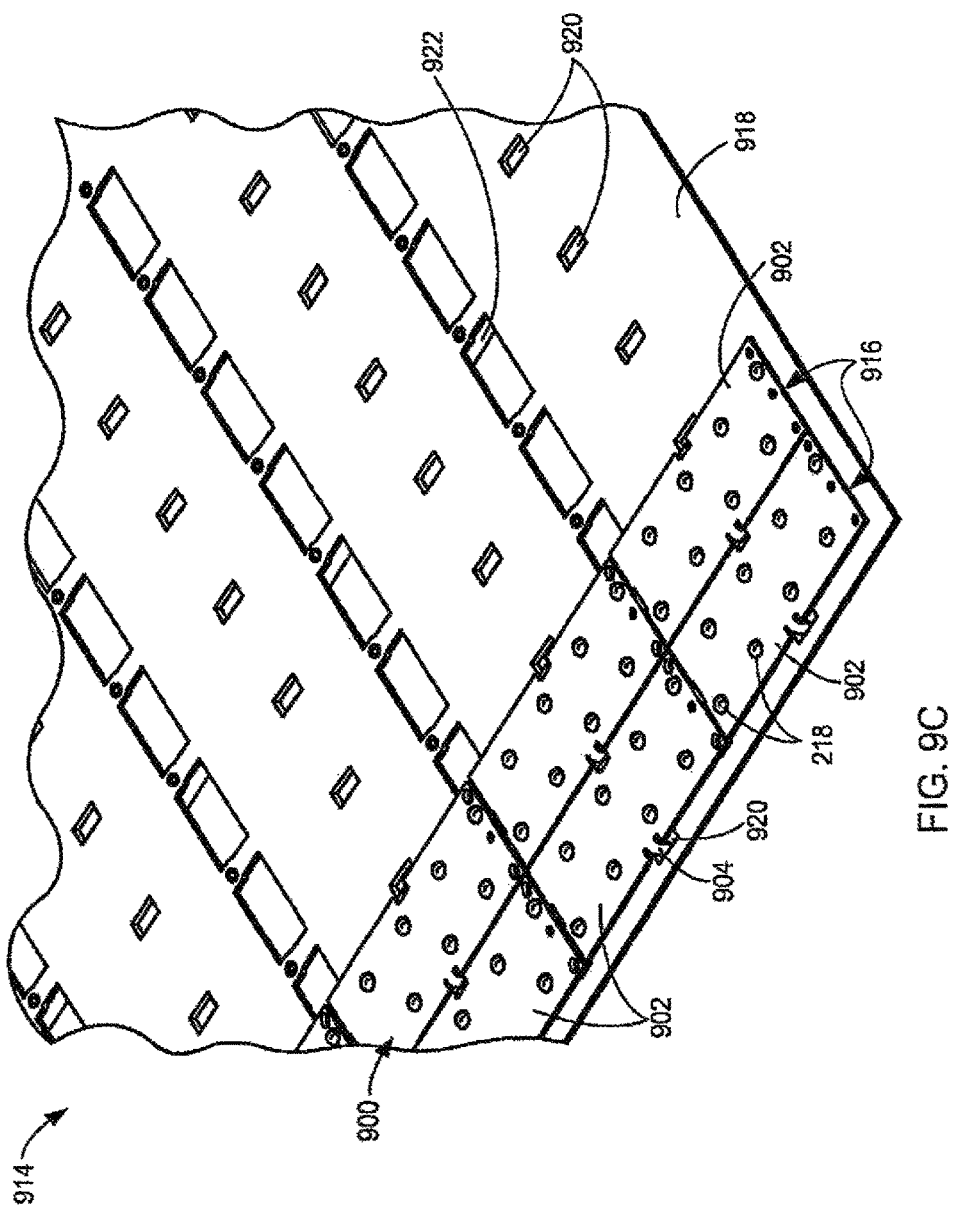
FIG. 9C is an isometric fragmentary view of two rows of the overlapping tiles of FIG. 9A assembled onto an array tray.

Referring now to FIG. 9C, therein is shown an isometric fragmentary view of an assembly 914 in which two rows 916 of the overlapping tiles 902 have been assembled onto an array tray 918. It will be understood, of course, that in a finished display, the array tray 918 would have many more rows 916 assembled thereonto. Only two rows 916 are illustrated in order to better reveal details of the assembly 914, including the array tray 918 that is beneath the rows 916.

Similarly, in other embodiments disclosed and illustrated herein, only a few tile rows will generally be shown so that the details of the array trays to which they are attached, in several of the embodiments, can be better shown.

The array tray 918 is provided with slots 920 that are located to receive the drop-and-slide hooks 904 of the overlapping tiles 902. The assembly 914 is then easily and quickly assembled by dropping the drop-and-slide hooks 904 through the slots 920 and sliding the rows 916 to cause the drop-and-slide hooks 904 to engage underneath the ends of the slots 920, thereby attaching the overlapping tiles 902 to the array tray 918.

To increase the strength, integrity, and rigidity of the array tray 918, one or more stiffeners 922 may be provided, for example, on the underside of the array tray 918 opposite the rows 916 that are on the top of the array tray 918. This further assists in maintaining the flatness of the array of the tiles 902.

Referring now to FIG. 9D, therein is shown an isometric view of an embodiment 924 having overlapping tiles 926. In the embodiment 924, each of the overlapping tiles 926 has a jog 928 located intermediately thereon that forms a foot 930 that, by comparison, is proportionately significantly larger than the jogged ends 910 (FIG. 9A) of embodiment 900 (FIG. 9A). Also, rather than being arranged in rows, such as the rows 916 (FIG. 9C), the overlapping tiles 926 are staggered both longitudinally and laterally, and are connected to each other by fasteners 932.

The staggered configuration of the overlapping tiles 926 and the larger sizes of the feet 930 provide sufficient structural and physical strength and integrity for the overlapping tiles 926 to be self-supporting without the need for an underlying array tray. The significant overlap and staggered configuration also significantly improve thermal conduction between and among the overlapping tiles 926, aiding temperature uniformity and heat removal for superior performance.

Referring now to FIG. 9E, therein is shown a side view of additional overlapping tiles 926 connected according to the embodiment 924 of FIG. 9D.

Referring now to FIG. 9F, therein is shown a side view of an embodiment 934 in which overlapping tiles 936 overlap by being tilted. When the overlapping tiles 936 overlap by tilt, as illustrated, it is possible that the LEDs 218 may not emit light in the desired direction, since the light may tend to emit perpendicularly to the surfaces of the individual overlapping tiles 936. In that case, it may be desirable to fabricate the LEDs 218 so that they emit more in the desired direction, such as at an appropriate angle to the top surfaces of the overlapping tiles 936.

With respect to the embodiment 934, the tilted and overlapping tiles 936 form a configuration, for example, somewhat like roof tiles, and thus average out overall to a flat surface. This illustrates that, depending upon the configuration, the overlapping tiles 936 do not necessarily need to be orthogonal with respect to the environment, nor do the LEDs 218 need to be orthogonal. In such a case, when tilted in this fashion rather than planar, the LEDs 218 can then be fabricated, as indicated, to direct the light as desired. That is, the LEDs 218 can be grown at a compensating angle, for example. Such an overlapping or tiled arrangement has several advantages, for example, providing improved structural strength, integrity, and rigidity, and improved heat transfer and heat management characteristics.

Figure 9G:
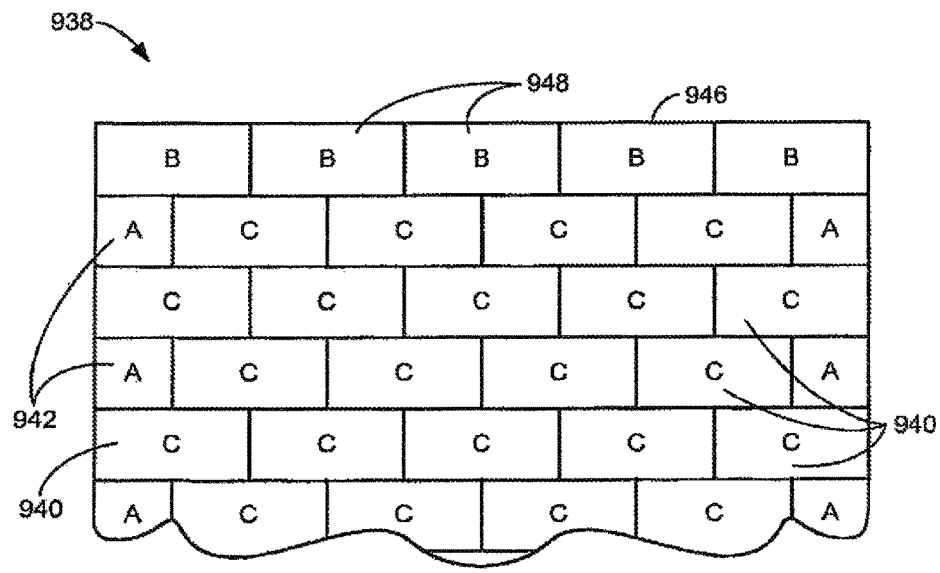
FIG. 9G shows a top view of an embodiment with staggered, overlapping tiles arranged to fill a regular geometric space.
Figure 9H:
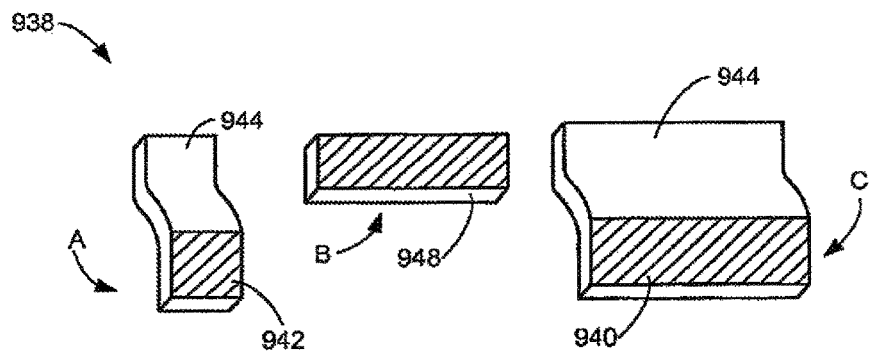
FIG. 9H is a top perspective view of the several tile types shown in the embodiment of FIG. 9G.

Referring now to FIGS. 9G and 9H, therein is shown an embodiment 938 illustrating, for example, how staggered tiles, such as the overlapping tiles 926 in FIG. 9D, can be arranged to fill a regular geometric space, such as a rectangle, having straight edges. In this embodiment, the majority of the tiles are overlapping tiles 940, for example similar to the overlapping tiles 926, arranged in a herringbone pattern. Then, to accommodate the staggered configuration, half tiles 942 are provided on the ends of alternating rows. The half tiles 942 are substantially the same as the overlapping tiles 940 but only approximately half as wide. Finally, to accommodate each foot 944 of the overlapping tiles 940 and 942 along the top edge perimeter 946, cap tiles 948 are provided for positioning over the feet 944. In one embodiment, the cap tiles 948 are substantially the same as the overlapping tiles 940 except that the cap tiles 948 do not have feet 944. The embodiment 938 thus provides the advantages of a staggered overlap to enhance thermal conduction and mechanical connection of the tiles in all directions, while also fitting snugly into a space that has straight edges.

Referring now to FIG. 10A, therein is shown a fragmentary isometric view of an embodiment 1000 in which snap-together tiles 1002 are snapped together into rows. In this embodiment, the snaps that hold the snap-together tiles 1002 together are flexures 1004, at one end of each snap-together tile 1002, that are springably received in matching slots 1006 at the opposite ends of the snap-together tiles 1002. In particular, each flexure 1004 has a detent 1008 on the end thereof that is springably received in its matching slot 1006 on the adjacent snap-together tile 1002.

Electrical connections and electrical continuity may be provided between the snap-together tiles 1002 by any suitable means, such as an electrically conductive tape 1010, edge connectors (not shown) flex interconnects (not shown), the optional use of pad connectors (not shown), and so forth.

Advantageously, it will now be understood by those of skill in the art, based upon the teachings herein, that electrical connections between and among the tiles of the various other embodiments disclosed herein may likewise be readily achieved and provided by conductive tape, edge connectors, and so forth, as disclosed herein and as desired and appropriate for the particular configurations and embodiments at hand.

Referring now to FIG. 10B, therein is shown an inverted detail view of the flexure 1004 and slot 1006 snap-together system for the snap-together tiles 1002.

Figure 10C:
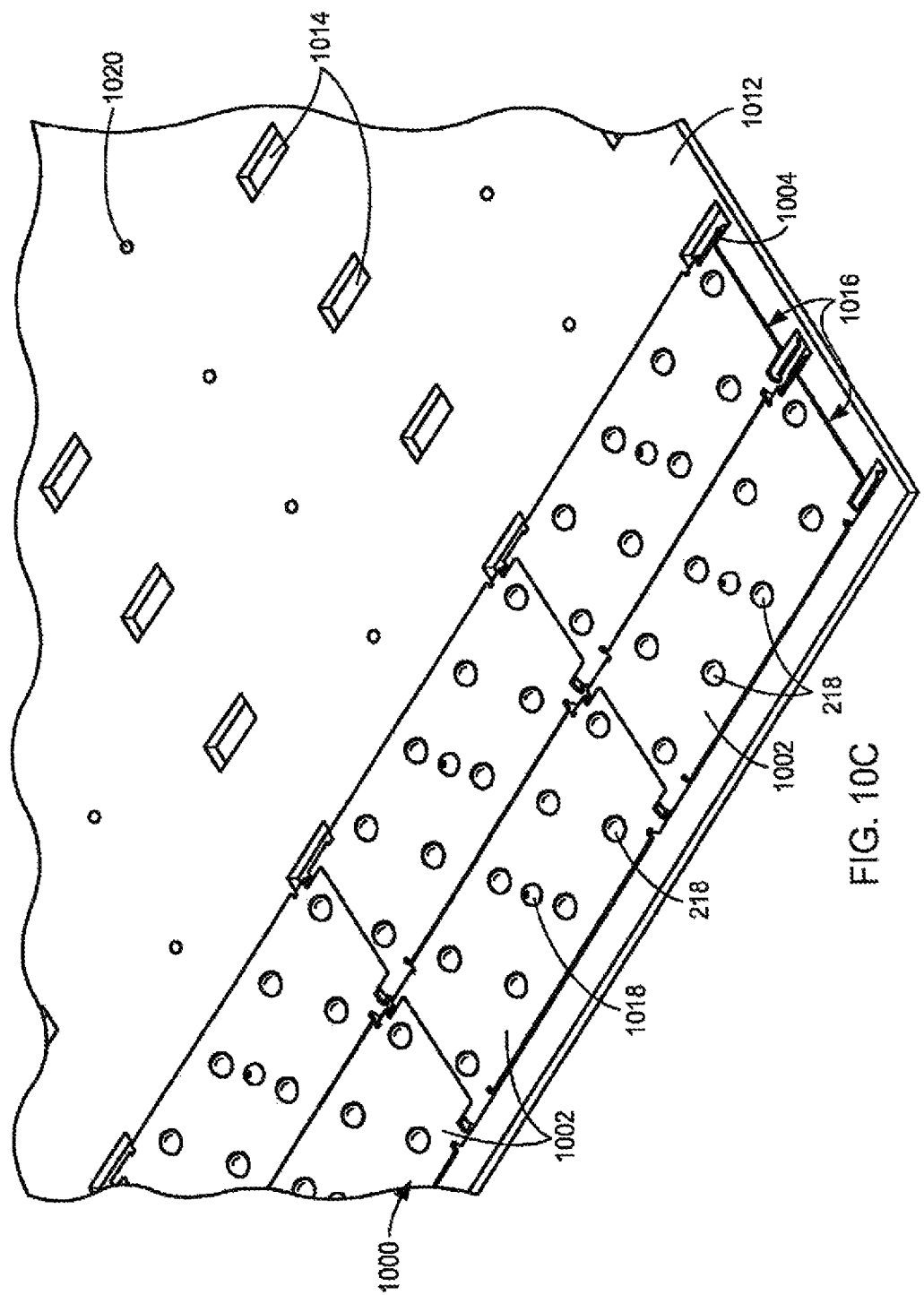
FIG. 10C is a fragmentary isometric view of an array tray having slots therein for receiving rows of the snap-together tiles of FIG. 10A.

Referring now to FIG. 10C, therein is shown a fragmentary isometric view of an array tray 1012 having slots 1014 therein for receiving rows 1016 of the snap-together tiles 1002. The rows 1016 of the snap-together tiles 1002 can be secured to the array tray 1012, for example, by screws 1018 that pass through the snap-together tiles 1002 to engage in screw holes 1020 in the array tray 1012.

Referring now to FIG. 11A, therein is shown an isometric view of an embodiment 1100 having tiles 1102 that are configured as side bend tiles. In this embodiment, the tiles 1102 have side bends 1104 along, for example, the longitudinal sides thereof, extending downwardly from the major top surfaces of the tiles 1102, and providing increased rigidity for the tiles 1102.

Each side bend 1104 has a tab 1106 at one end. Holes 1108 are formed at each end of the side bends 1104. The side bends 1104 in this embodiment are split and slightly staggered inwardly and outwardly, from one end to the other, so that they can overlap when the tiles 1102 are assembled to each other in series.

When the tiles 1102 are assembled in series into rows, the holes 1108 in the side bends 1104 line up so that the tiles 1102 can be secured to each other by screws 1110. This results in a strong row of assembled tiles 1102 having increased rigidity. With this configuration, the tiles 1102 can also be self-aligning.

Referring now to FIG. 11B, therein is shown an inverted fragment of tiles like the tiles 1102 shown in FIG. 11A, aligned for serial attachment to one another and showing in greater detail the alignment of the holes 1108.

Figure 11C:
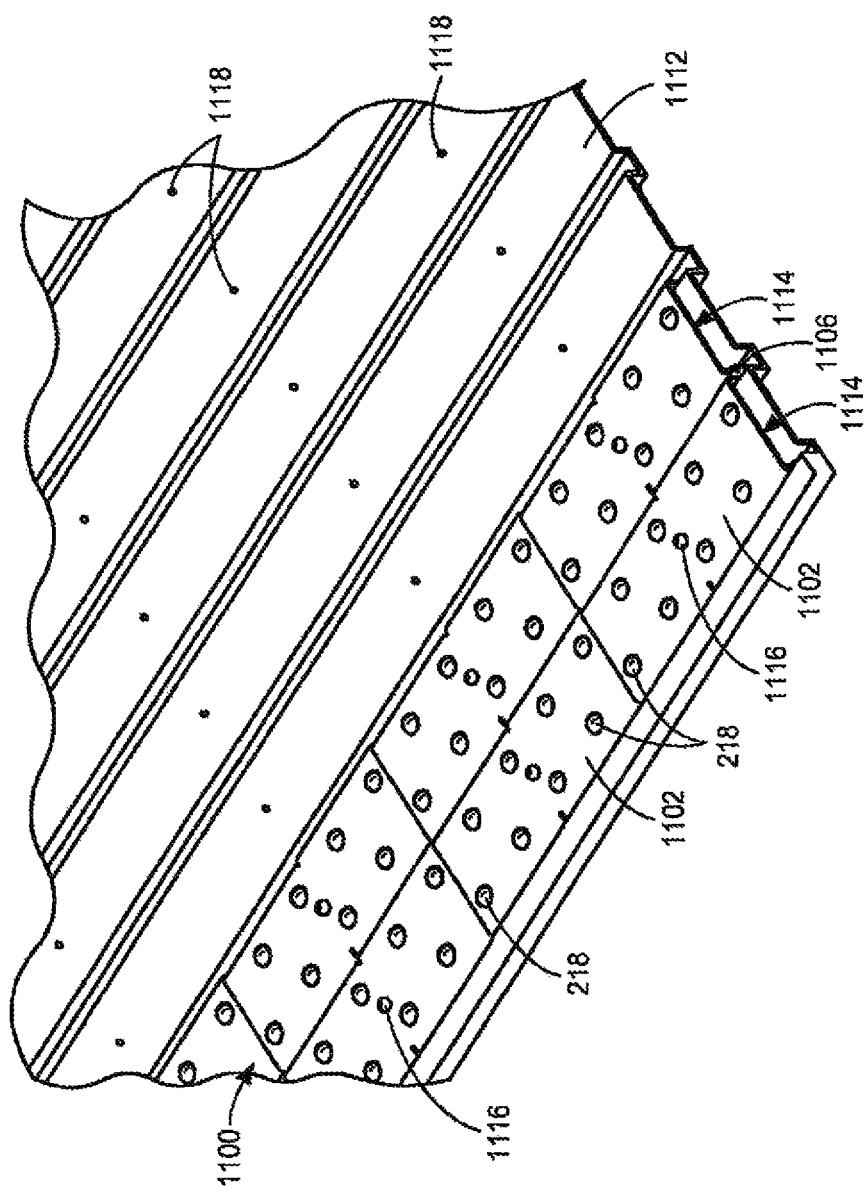
FIG. 11C is a fragmentary isometric view of an array tray receiving rows of the assembled tiles depicted in FIG. 11A.

Referring now to FIG. 11C, therein is shown a fragmentary isometric view of an array tray 1112 receiving rows 1114 of the assembled tiles 1102. The array tray 1112 has an extruded corrugated configuration that provides additional strength, integrity, and rigidity. Depending upon the particular dimensions that are provided, the array tray 1112 can also provide self-alignment for the tiles 1102. The rows 1114 of the tiles 1102 may be secured to the array tray 1112 by any suitable means, such as screws 1116 passing through the tiles 1102 into holes 1118 in the array tray 1112.

Referring now to FIG. 12A, therein is shown an end view of an embodiment 1200 having tiles 1202 that are not attached directly to one another, but instead are attached in groups to rails 1204. (A single tile 1202 and single rail 1204 are shown in FIG. 12A.) The rails 1204 then assemble and support the groups of the tiles 1202 into row structures formed thus with increased rigidity. In one embodiment, the rails 1204 are sheet metal rails having a jog 1206 allowing the rails 1204 to be assembled to each other in overlapping fashion (see FIG. 12B).

For ease and simplicity of assembly, the rails 1204 have a return 1208 along one side that forms a pocket 1210. The tiles 1202 are then captured along one tile edge in the pocket 1210, and then securely attached to the rail 1204 with only a single tile screw 1212. That is, the return 1208 creates a "V" shape that forms the pocket 1210 that easily captures a tile therein, providing for rapid and secure assembly with the requirement of only the single tile screw 1212.

Referring now to FIG. 12B, therein is shown a fragmentary isometric view of an open frame 1214 to which the overlapping rails 1204 are attached with rail screws 1216. Unlike the array trays in previous embodiments of the present invention, the overlapping sheet metal rails 1204 provide sufficient increased rigidity that an entire tray is not required. Instead, weight and material savings can be realized by using an open frame such as the open frame 1214.

Referring now to FIG. 13A, therein is shown an end view of an embodiment 1300 also having tiles attached in rows to rails. In embodiment 1300, tiles 1302 are mounted longitudinally in a row (see FIG. 13B) on a rail 1304. The rail 1304 may be extruded, and has a pocket 1306 formed along one side by a return 1308 to capture an edge of the tile 1302 therein. The bottom of the pocket 1306 includes a small radius clearance 1310 that is undercut slightly below the surface of the rail 1304 on which the tile 1302 is mounted.

The small radius clearance 1310, thus located under the edge of the tile 1302 that is captured in the pocket 1306, provides a thickness tolerance for the tiles 1302, particularly where the pocket 1306 is dimensioned close to the thickness of the tiles 1302. In this way, slight variations in tile thicknesses are accommodated by the small radius clearance 1310 beneath the pocket 1306, allowing thicker tiles to fit and bend slightly into the small radius clearance 1310.

Opposite the pocket 1306, on the other side of the rail 1304, is a hole 1312 in the rail 1304. The hole 1312 aligns with a matching hole 1314 in the tile 1302, so that a clip 1316, such as a U-shaped spring steel clip, formed with protrusions 1318, can capture and retain the tiles 1302 on the rails 1304 by clipping the protrusions 1318 into the holes 1312 and 1314. Consequently, the small radius clearance 1310 effectively provides for preloading the tile edge therein to provide a thickness tolerance for the tiles 1302. The clips 1316 provide for rapid and easy assembly of the tiles 1302 onto the rails 1304, typically faster than would be required to align and assemble with screws. This also results in the formation of rows with increased rigidity.

Referring now to FIG. 13B, therein is shown a fragmentary isometric view of a portion of the embodiment 1300.

Figure 13C:
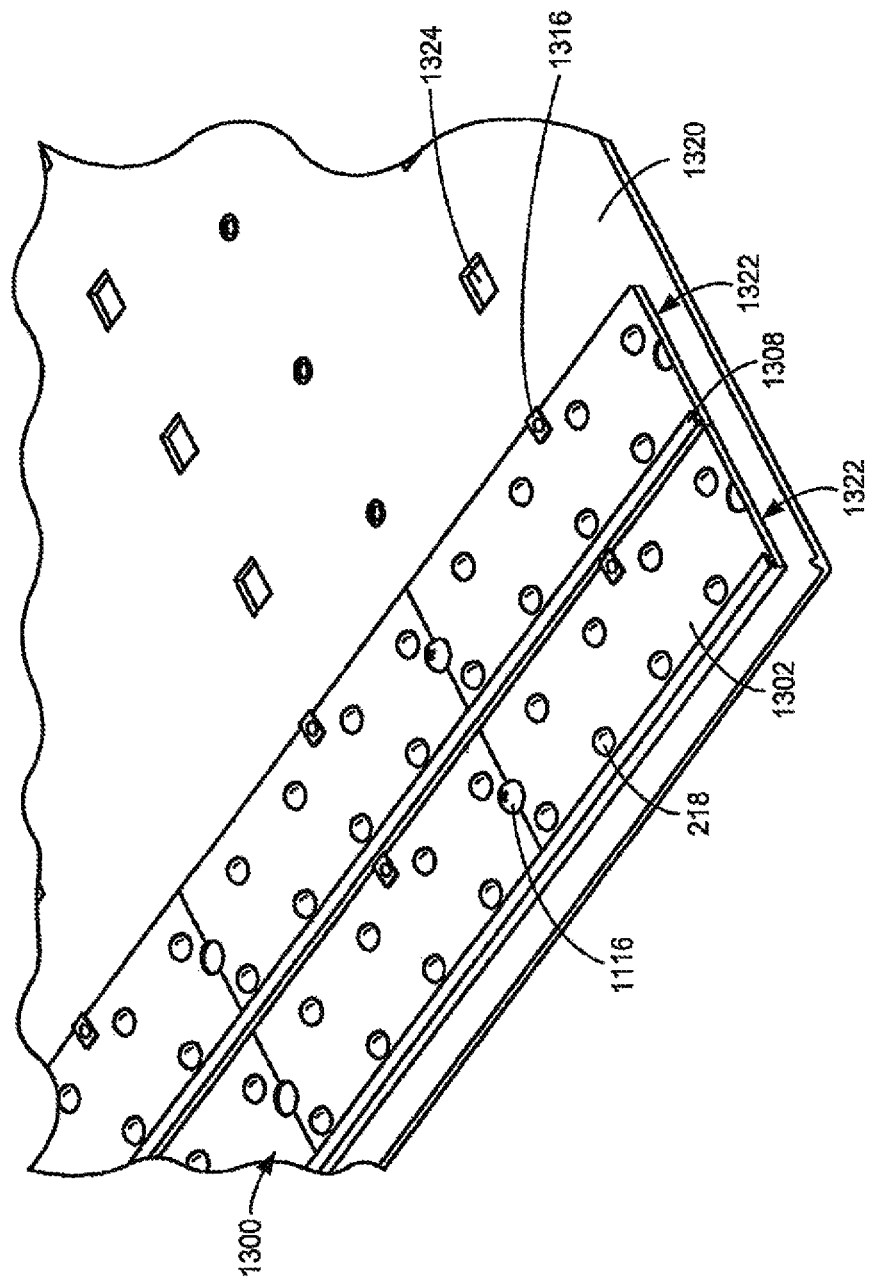
FIG. 13C is a fragmentary isometric view of an array tray with rows of the embodiment of FIGS. 13A and 13B attached thereon.

Referring now to FIG. 13C, therein is shown a fragmentary isometric view of an array tray 1320 on which rows 1322 of the embodiment 1300 are attached. Holes 1324 provide clip clearance for the clips 1316 in the array tray 1320. The array tray 1320 provides additional stiffness for the embodiment 1300, particularly in the direction transverse thereto. This further assists in maintaining the flatness of the array of the tiles 1302.

Referring now to FIG. 14A; therein is shown an end view of an embodiment 1400 in which tiles 1402 have tile arms 1404 along the sides thereof that are bent in a "U" shape around the sides of a T-rail 1406 to engage the T-rail 1406 and attach themselves thereto. Each T-rail 1406 then serves as a substrate that defines a row of the tiles 1402, which are affixed in a longitudinal series thereon, forming rows with increased rigidity.

Referring now to FIG. 14B, therein is shown a fragmentary isometric view of a portion of the embodiment 1400.

Referring now to FIG. 14C, therein is shown an inverted view of the portion of the embodiment 1400 shown in FIG. 14B. Tips 1408 of spring fingers 1410, extending longitudinally from the tile arms 1404 on the underside of the T-rail 1406, are received and held in corresponding pockets 1412 in the T-rail 1406 to secure the tiles 1402 in position on the T-rail 1406.

The embodiment 1400 thus provides increased rigidity due to the increased strength and integrity provided by the T-rails 1406 and the structural stiffening afforded by the bent-around tile arms 1404. This further assists in maintaining the flatness of the array of the tiles 1402. The T-rails 1406 may be economically and efficiently fabricated, for example as extrusions, and the pockets 1412 may then be formed therein by any suitable conventional process.

Concerning the spring fingers 1410, they not only conveniently locate the respective tiles 1402 in the proper locations on the T-rails 1406, but the spring fingers 1410 additionally pressure the tiles 1402 forward and against the T-rails 1406 for improving convective area and heat exchange thermal contact therebetween.

Figure 14E:
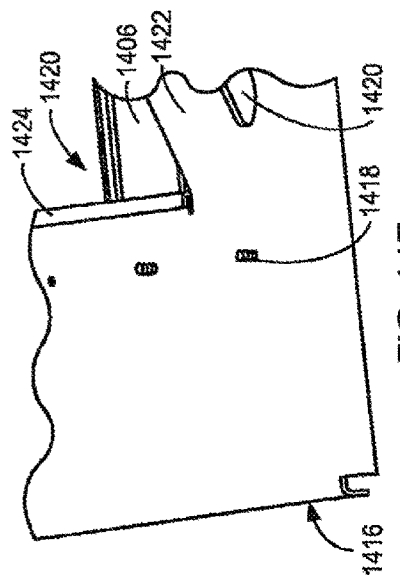
FIG. 14E is a bottom isometric view of the corner of the structure illustrated in FIG. 14D.
Figure 14F:
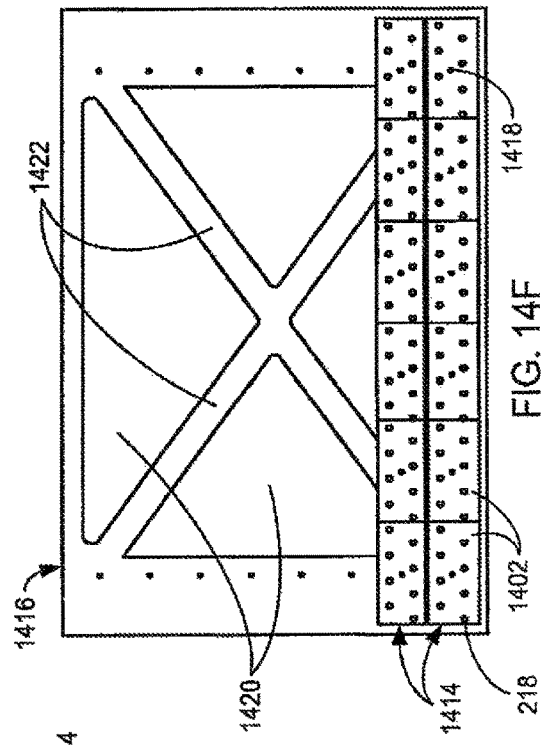
FIG. 14F is a top view of an array tray with two of the FIG. 14B rows mounted thereon.
Figure 14D:
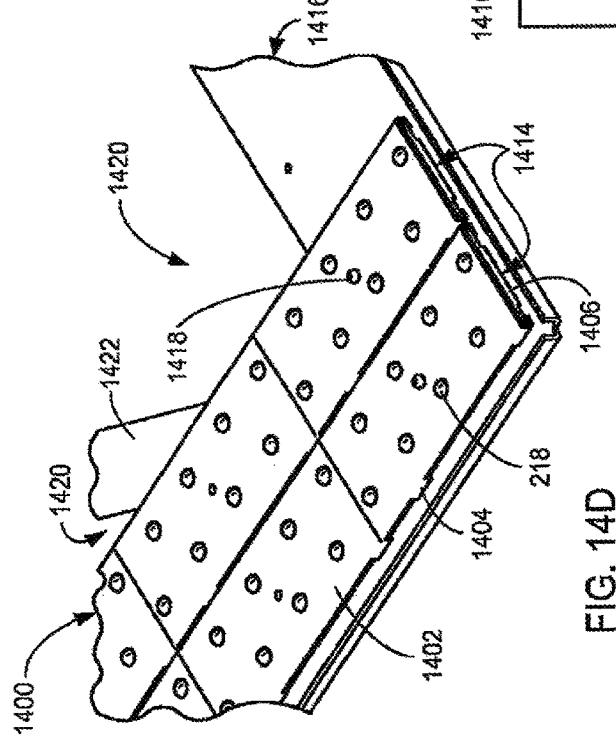
FIG. 14D is a fragmentary isometric view of rows of the embodiment shown in FIG. 14B attached to an open frame array tray.

Referring now to FIG. 14D, therein is shown a fragmentary isometric view of rows 1414 of the embodiment 1400 attached to an array tray 1416 by screws 1418. The array tray 1416, for this embodiment 1400, is an open frame having cut outs 1420 therein that define cross members 1422. The cut outs 1420 advantageously reduce the weight of the array tray 1416. While the cut outs 1420 also reduce the overall strength of the array tray 1416, this is acceptable due to the additional stiffness, strength, integrity, and rigidity provided by the companion T-rails 1406 with the tiles 1402 attached thereon.

Referring now to FIG. 14E, therein is shown a bottom isometric view of the corner of the structure illustrated in FIG. 14D. The inner edge of the array tray 1416 along the cut outs 1420 is bent over and under the array tray 1416 to form a hem 1424. The configuration of the hem 1424 is a stiffness-improving feature for the array tray 1416. This further assists in maintaining the flatness of the array of the tiles 1402.

Referring now to FIG. 14F, therein is shown a top view of the array tray 1416 with two of the rows 1414 mounted thereon.

Figures 15A, 15B:
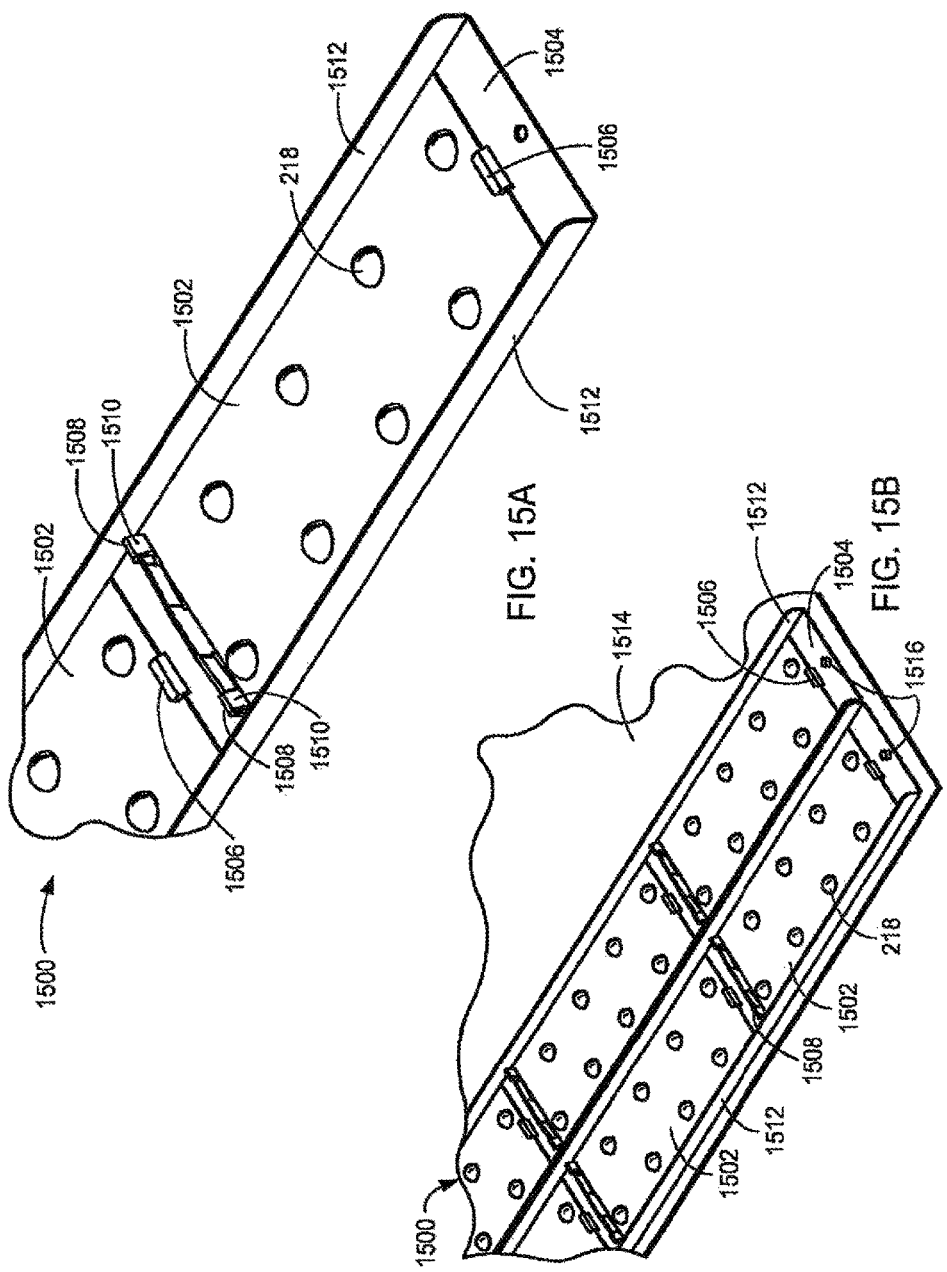
FIG. 15A is a fragmentary isometric view of a snap-in rail embodiment that does not require separate fasteners to attach tiles thereto.
FIG. 15B is a fragmentary isometric view of an array tray with the snap-in rails of FIG. 15A attached thereon.

Referring now to FIG. 15A, therein is shown a fragmentary isometric view of an embodiment 1500 in which no fasteners are separately required to attach tiles 1502 to a snap-in rail 1504. Instead, the snap-in rails 1504 in the embodiment 1500 have hooks 1506 placed at intervals therealong slightly longer than the lengths of the tiles 1502. The snap-in rails 1504 may, for example, be constructed of sheet metal, and the hooks 1506 may be punched up therefrom and formed so that the tiles 1502 can be slipped under the hooks 1506 and captured therein to form rows with increased rigidity.

Assembly of the tiles 1502 onto the snap-in rails 1504 is then completed, after hooking the tiles 1502 under the hooks 1506, by rotating the tiles 1502 downwardly past snap-in retainers 1508 onto the snap-in rail 1504. The snap-in retainers 1508 are flexures having a beveled detent 1510 thereon just above the upper surface of the snap-in rail 1504 and positioned to project slightly over a tile 1502 when snapped into position and retained at the opposite end by the hook 1506. The snap-in retainers 1508 may be formed from the material of the snap-in rails 1504, or may be inserted as a separate spring part, as desired.

Each tile 1502 is then snapped into position by pressing the end adjacent the snap-in retainers 1508 downwardly causing the detent 1510 to flex momentarily out of the way and then snap back over the tile 1502 to capture it in place.

When the tiles 1502 are thus snapped onto the snap-in rail 1504, each tile is held in position by a hook 1506 and a snap-in retainer 1508. The hook 1506 receives and holds one end of the tile 1502, and the snap-in retainer 1508 forms a spring-snap flexure that receives and holds the opposite end of the tile 1502.

The snap-in rail 1504 may advantageously have sheet metal bends 1512 formed longitudinally along the longitudinal edges thereof to add longitudinal stiffness to the snap-in rails 1504. Consequently, the snap-in rails 1504 form rows with increased rigidity, part of the increased rigidity resulting from the combination of the stiffness from the tiles 1502 being attached to the snap-in rails 1504, and part of the increased rigidity being a result of the sheet metal bends 1512 that are formed along the longitudinal edges of the snap-in rails 1504. This further assists in maintaining the flatness of the array of the tiles 1502.

Referring now to FIG. 15B, therein is shown a fragmentary isometric view of an array tray 1514 onto which snap-in rails 1504 are attached, for example, by screws 1516.

Referring now to FIG. 16A, therein is shown an end view of an embodiment 1600 in which tiles 1602 are held securely on a rail 1604 by a lip 1606, forming rows with increased rigidity. The lips 1606 are formed integrally on the rails 1604, for example by extrusion of the rails 1604. Initially in an open position, the lip 1606 is then deformed, for example under the force of a press (not shown), to bend the lip 1606, such as in the direction of the arrow 1608, over and onto the tiles 1602 along one longitudinal edge thereof. In this manner, the tiles 1602 are captured and held tightly on the top of the rails 1604 by the lip 1606. That is, the lips 1606 are deformable onto the edges of the tiles 1602 thereadjacent, retaining the tiles 1602 underneath the lip 1606 by deforming the lip 1606 thereagainst.

Referring now to FIG. 16B, therein is shown a fragmentary isometric view of several rails 1604 of the embodiment 1600 positioned on an array tray 1610. Each of the rails 1604 may be attached to the array tray 1610 by screws (not shown) inserted through screw holes 1612 in the rails 1604.

Retention of the tiles 1602 by the lip 1606 may be enhanced by holes 1614 formed in the edges of the tiles 1602 in positions that locate the holes 1614 underneath the lip 1606 after it is deformed or bent thereover. The lips 1606 then engage the holes 1614 therebeneath, thereby enhancing retention of the tiles 1602. In other words, when the lip 1606 is crimped onto the tile 1602, a little bit of the material from the lip 1606 actually extrudes into the holes 1614, thereby catching the tile 1602. Consequently, the tile 1602 can be firmly attached to the rail 1604 without requiring any separate fasteners.

Figure 17A:
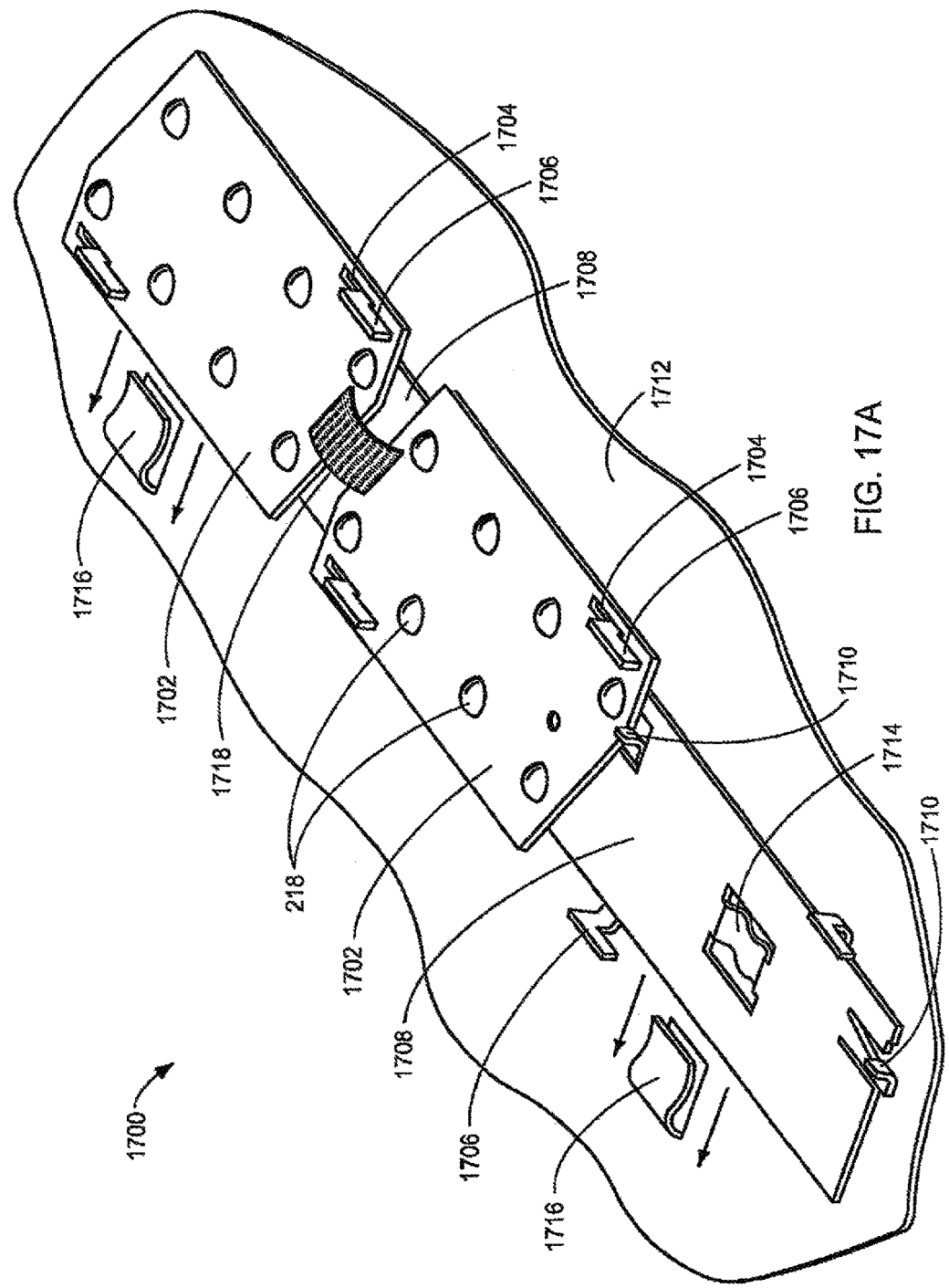
FIG. 17A is a fragmentary isometric view of an embodiment having a drop-and-slide configuration.

Referring now to FIG. 17A, therein is shown a fragmentary isometric view an embodiment 1700 having a drop-and-slide configuration in which tiles 1702 have slots 1704 therein that match hooks 1706 on a rail 1708. The hooks 1706 are drop-and-slide hooks such that the tiles 1702 are dropped over the hooks 1706 and receive the hooks 1706 through the slots 1704. The tiles 1702 are then slid horizontally to slip underneath the hooks 1706 to be engaged and held firmly against the rail 1708. Upon sliding into position, a spring finger 1710 is then revealed and released against the end of the tile 1702 that moves toward the hooks 1706 as the tiles 1702 is being slid thereunder. The spring finger 1710 then holds the tiles engaged with the hooks 1706 to lock the tiles 1702 on the rail 1708 to form rows with increased rigidity. The tiles 1702 can thus be attached to the rails 1708 without separate fasteners.

The combination of the tiles 1702 captured in this fashion on the rail 1708 forms a row with increased rigidity.

Similarly, the rails 1708 can be attached to an array tray 1712 without separate fasteners by engaging tabs 1714 formed on and underneath the rails 1708 into clips 1716 on the array tray 1712. In one embodiment, as shown, the tabs 1714 and the clips 1716 are configured to constitute a drop-and-slide feature, such that the tabs 1714 drop beneath the clips 1716, below the array tray 1712, so that the rail 1708 is held snugly against the array tray 1712.

For providing electrical continuity between the tiles 1702, a ribbon connector 1718 is provided between adjacent tiles 1702.

Figure 17B:
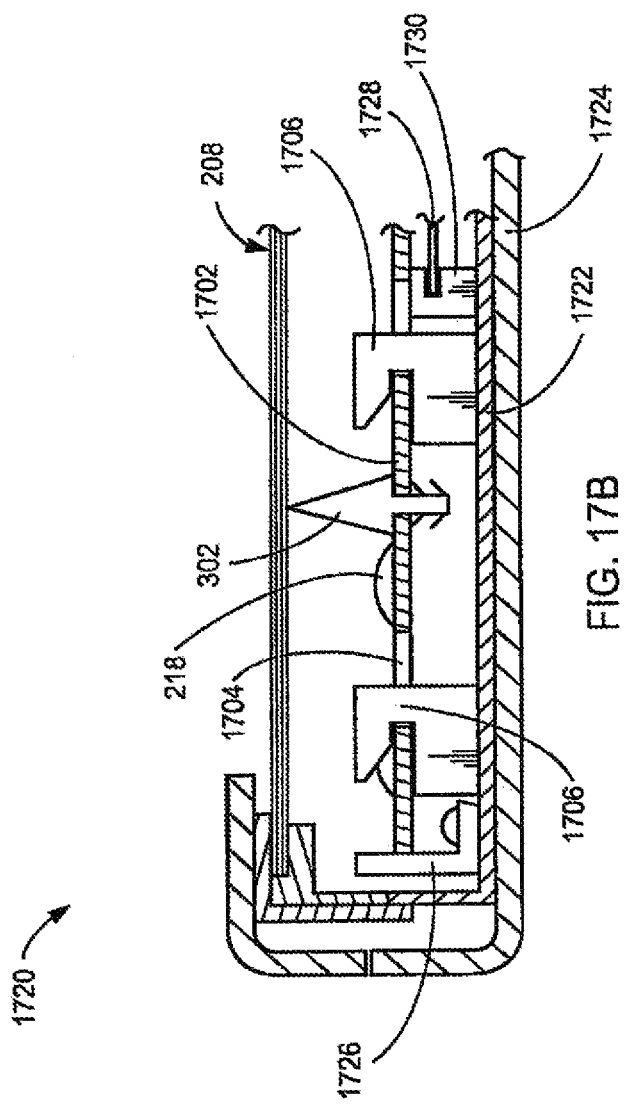
FIG. 17B is a cross-sectional side view of another embodiment having another drop-and-slide configuration.

Referring now to FIG. 17B, therein is shown a cross-sectional side view of an embodiment 1720 having another drop-and-slide configuration. In this embodiment, a rail 1722 is attached to an array tray 1724, and the rail 1722 has an end stop 1726 mounted thereon to hold the tiles 1702 engaged with the hooks 1706 to lock the tiles 1702 on the rails 1722.

The embodiment 1720 illustrates additional aspects of the present invention, wherein the versatility of the invention, for example, allows the array tray 1724 to function as well as the external housing for the display, or vice versa. Also shown is a PCB 1728 captured and supported in a stand 1730 beneath the tiles 1702. Additionally, the hooks 1706 may be configured to provide electrical connections (not shown) to the tiles 1702.

Referring now to FIG. 18A, therein is shown an end view of an embodiment 1800 in which tiles 1802 are engaged along one edge in a retaining channel 1804 of a rail 1806 on which the tiles 1802 are placed. The rails 1806 may be formed, for example, by extrusion. In one embodiment, the retaining channels 1804 are shaped as overhanging lips formed along one edge of the rail 1806 and extending upwardly and over the top surface of the rail 1806 and over the adjacent edge of each of the tiles 1802 when located thereon.

Once the tiles 1802 are in position on the top of the rail 1806 and captured along one edge in the retaining channel 1804, a retainer spring 1808 is then positioned downwardly against the edges of the tiles 1802 along the edge of the rail 1806 opposite the retaining channel 1804. The retainer spring 1808 is then secured in position, for example, by screws 1810.

The retainer springs 1808 may be formed of a suitable resilient material, such as spring steel, and function thereby not only to hold the tiles 1802 in place on top of the rails 1806, but to maintain a downward and lateral pressure on the tiles 1802. The retainer springs 1808 thus press the tiles 1802 against the rails 1806 for better heat transfer, hold the tiles 1802 in position on the rails 1806 against vibration, and so forth. The retainer springs 1808 also press the tiles 1802 laterally toward the retaining channel 1804 for better attachment to the rails 1806.

Referring now to FIG. 18B, therein is shown a fragmentary isometric view of the structure in FIG. 18A. In one embodiment, the retainer springs 1808 have a relief 1812, or slot, formed between each of the tiles 1802. The reliefs 1812 provide retainer springs 1808 that are at least partially discontinuous between the tiles 1802, thereby largely separating the portions of the retainer springs 1808 that contact each of the tiles 1802. Consequently, each tile effectively has its own retainer spring 1808, since the spring sections are individualized and separated from each other by the reliefs 1812.

Referring now to FIG. 18C, therein is shown a view similar to that shown in FIG. 18B but rotated clockwise approximately 90 degrees to better show access gaps 1816 that may be formed in one or more corners of the tiles 1802. The access gap 1816 is akin to a missing corner and, when adjacent the retainer spring 1808, provides ready access to the tile 1802 for engaging the tile to pry the tile loose from underneath the retainer spring 1808. This facilitates removing the tile without having to remove the entire retainer spring 1808. The reliefs 1812 further facilitate such individual tile removal.

The combination of the tiles 1802 attached securely to the rails 1806 thus forms rows of the tiles 1802 with increased overall rigidity. Screw holes 1814 in the rails 1806 provide a convenient configuration and means for attaching the rails 1806 to an underlying support structure, such as an array tray (not shown).

Advantageously, the embodiment 1800 thus provides for readily, quickly, and efficiently assembling tiles 1802 into rows with a minimum number of fasteners while securely holding the tiles 1802 in position.

Referring now to FIG. 19A, therein is shown an isometric view of an embodiment 1900 in which tiles 1902 are attached directly to an array tray 1904 to give the array tray 1904 sufficient additional combined structural strength and integrity to enable the array tray 1904 to support the tiles 1902 that are attached directly thereon. As used herein, the phrase "to enable it to support" is defined to mean that the array tray 1904 is not strong enough to support the tiles 1902 on its own, and can support the tiles 1902 only by virtue of the additional structural strength and integrity provided by the tiles 1902 themselves, and working in concert with the array tray 1904.

The array tray 1904 may be formed, for example, by forming sheet metal. The sides of the array tray 1904 may include legs 1906 that extend at an angle therefrom to further stiffen and strengthen the array tray 1904 and tile 1902 assembly. This further assists in maintaining the flatness of the array of the tiles 1902.

The legs 1906 may additionally be formed, for example, to reach around and define a PCB area 1908 in which PCBs such as PCBs 1910, and other electrical/electronic components, may be attached and supported.

These components can then all be thermally as well as structurally integrated, such as, for example, by using a thermal grease or other thermally conducting material (not shown) between the tiles 1902 and the array tray 1904, and similarly providing heat conducting facilities between the PCBs 1910 and the array tray 1904. Effective heat conduction away therefrom by the array tray 1904 can be facilitated, for example, by forming feet 1912 on the bottom of the legs 1906 of the array tray 1904. The feet 1912 can then be attached to a suitable frame or body member for removing heat therefrom, as well as supporting the array tray 1904 and assembled components within a display.

Referring now to FIG. 19B, therein is shown an enlarged cross-sectional view of a portion of the embodiment 1900 illustrated in FIG. 19A, taken generally on line 19B-19B in FIG. 19A. In this embodiment, the tiles 1902 can be conveniently and efficiently attached to the array tray 1904 by suitable fasteners, such as pairs of rivet fasteners 1914. In one embodiment, a clinch rivet metal fastener can be used, such as a TOX® fastener ("TOX" is a registered trademark of PRESSOTECHNIK GMBH Corporation, Weingarten, Germany).

Figure 20A:
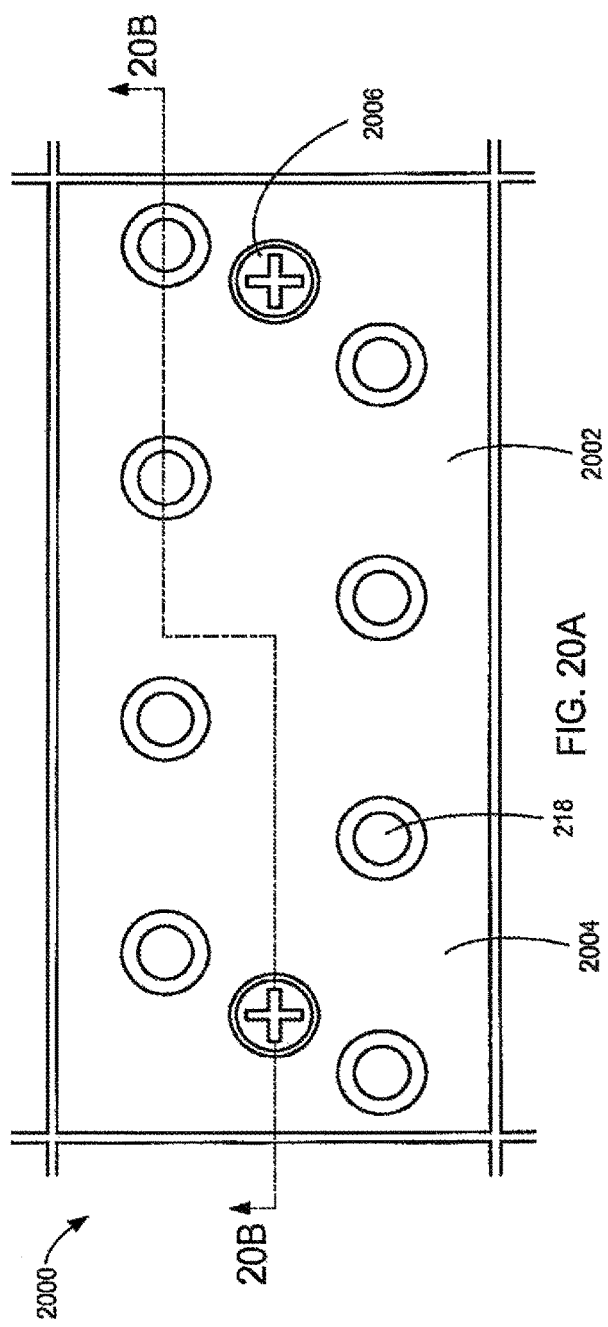
FIG. 20A is a top view of an embodiment in which tiles are structurally attached to a diffuser.

Referring now to FIG. 20A, therein is shown a top view of an embodiment 2000 in which tiles 2002 are structurally attached to the underside of a clear or translucent diffuser, such as a diffuser plate 2004. The tiles can be attached to the diffuser plate 2004 by any suitable means, such as a screw fastener 2006, thereby reinforcing the diffuser plate 2004 to give it sufficient additional structural strength and integrity to enable it to support the tiles 2002 attached thereon.

Figure 20B:
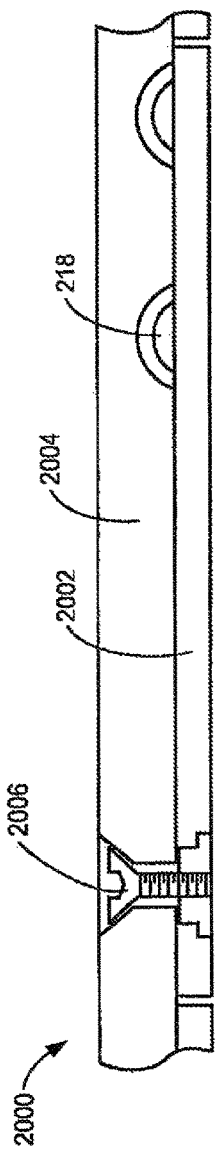
FIG. 20B is a cross-sectional view of the structure of FIG. 20A taken on line 20B-20B in FIG. 20A.

Referring now to FIG. 20B, therein is shown a cross-sectional view of the structure of FIG. 20A taken on line 20B-20B in FIG. 20A.

Referring now to FIG. 21A, therein is shown an isometric view of an embodiment 2100 in which a tile 2102 has a screw hole 2104 therethrough, passing from top to bottom, and a notch 2106 in at least one of the sides. The tile 2102 is thereby well adapted for inclusion in a sandwich type of structure.

Referring now to FIG. 21B, therein is shown a cross-sectional view of the structure illustrated in FIG. 21A, taken on line 21B-21B therein, and in which the tile 2102 is sandwiched between an upper plate 2108 and a lower plate 2110. A screw 2112 passes through a screw hole 2114 in the upper plate 2108. The screw hole 2114 is aligned with the screw hole 2104 in the tile 2102, so that the screw 2112 can pass through the screw holes 2104 and 2114 to engage a nut 2116 that is anchored in the lower plate 2110. This configuration structurally attaches the tile 2102 between the upper plate 2108 and the lower plate 2110 to give the upper plate 2108 and the lower plate 2110 sufficient additional structural strength and integrity to enable them to support the tiles 2102 attached thereon and therebetween.

To align the tiles 2102 on the lower plate 2110, a half shear 2118 may be provided on the upper surface of the lower plate 2110 to engage the notches 2106 in the tile 2102. This provides for rapid and accurate assembly, and permits the use of but a single screw 2112 to assemble each tile 2102 accurately and to hold the assembly together.

Referring now to FIG. 22A, therein is shown an end view of an embodiment 2200 in which an extruded tray 2202 has "T" cross bars 2204 formed on and extending over the top surface thereof. The "T" cross bars 2204 capture tiles 2206 in slots 2208 that are provided beneath the caps of the "T" cross bars 2204 above the top surface of the extruded tray 2202. The tiles 2206 are thus structurally captured directly in the slots 2208 in the extruded tray 2202 to give the extruded tray 2202 sufficient additional structural strength and integrity to enable it to support the tiles 2206 that are attached thereon.

Referring now to FIG. 22B, therein is shown an isometric view of a portion of the embodiment 2200 with the addition of stops 2210 on the ends thereof. The stops 2210, which are located at or across the ends of the slots 2208, then capture the tiles 2206 in place and hold them in place.

Referring now to FIG. 22C, therein is shown a somewhat figurative top view of an alternative configuration for holding the tiles 2206 in place on the extruded tray 2202. For clarity of illustration, only one "T" cross bar 2204 is shown, so that springs, such as a wire form 2212 located therebeneath on the extruded tray 2202, can be more easily seen. The wire forms 2212 then engage or snap into detents 2214 that are formed in corresponding locations in the sides of the tiles 2206 to engage and hold the tiles 2206 in place. The wire forms 2212 then form tray wire springs for the matching tile detent 2214 engagement configurations to snap the tiles 2206 in place on the extruded tray 2202.

Figure 23:
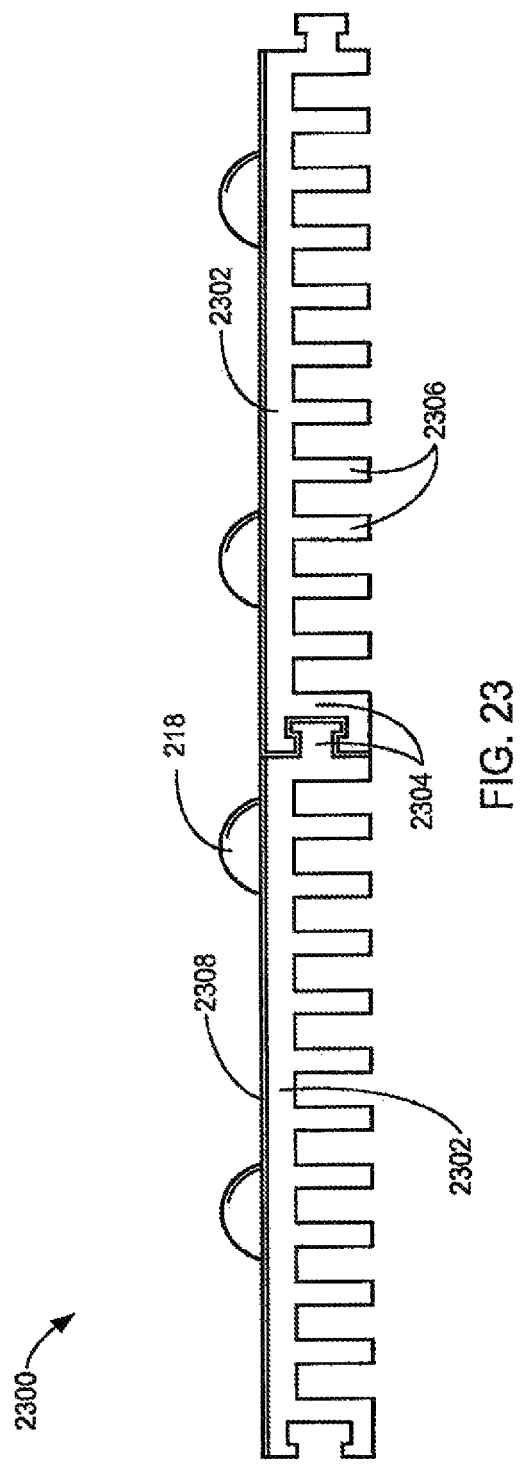
FIG. 23 is an end view of an embodiment in which the tiles are their own supporting structure, and interlock to form a structurally integrated matrix.

Referring now to FIG. 23, therein is shown an end view of an embodiment 2300 in which the tile 2302 itself serves as its own supporting structure. The tile 2302 thus incorporates a dovetail feature 2304 along the sides thereof for interlocking with adjacent tiles 2302. By virtue of the dovetail feature 2304, the tiles 2302 are then able to form a structurally integrated tile matrix. The tiles 2302 also have integral heat sinks 2306 that are oriented vertically on the backs or bottoms of the tiles 2302.

In one embodiment, the tiles 2302 are formed as extruded tiles on which the LEDs 218 and electrical circuits 2308 are formed on the top surfaces thereof, such as by printing. Thermal grease (not shown) may additionally be utilized within the dovetail feature 2304 to ensure good heat conduction between the tiles 2302.

Referring now to FIG. 24A, therein is shown an isometric view of an embodiment 2400 in which the tiles 2402 are not only self-supporting, but in addition have high rigidity, light weight, substantial stiffness, and high torsional resistance, affording great and consistent co-planarity for the LEDs 218. The tiles 2402, which may be formed of a sheet metal construction, have sides 2404 depending at right angles therefrom. A foot 2406 may be attached to or formed in one or more of the sides 2404, and provided with a screw hole 2408 for attaching the tiles 2402 to each other as well as to a supporting substrate, such as a display enclosure. An access hole 2410 may be provided in the tile 2402 for accessing a screw hole 2408 in an adjacent tile foot 2406.

Referring now to FIG. 24B, therein is shown a side view of an embodiment 2412 similar to the embodiment 2400 (FIG. 24A). Embodiment 2412 is attached by screws 2414 to a display shell 2416, such as a display enclosure. Tiles 2418 in embodiment 2412 may also be provided, as appropriate, with cut-away sides 2420 for attaching PCBs 2422 directly to the tiles 2418. Alternatively, the PCBs 2422 may be attached to and supported on the display shell 2416, with the cut-away sides 2420 providing clearance for the PCBs 2422.

Referring now to FIG. 24C, therein is shown a side view of an embodiment 2424 similar to the embodiment 2400 (FIG. 24A) and the embodiment 2412 (FIG. 24B). In the embodiment 2424, the tiles 2426 are attached to each other by fasteners 2428, such as integrally formed clinch rivet metal fasteners.

Embodiments 2400, 2412, and 2424 (FIGS. 24A, 24B, and 24C, respectively) thus constitute box tiles that have bends that form a multi-sided box. The box tiles are structurally joined to each other to form a structurally integrated, substantially rigid, three-dimensional tile matrix. In one embodiment, a subset of the box tiles is thermally and structurally attached to an enclosure (e.g., the display shell 2416), and a subset of the box tiles is thermally and supportingly attached optionally to one or more electronic circuit boards (e.g., the PCBs 2422) that may be conveniently located in one or more cut-away sides 2420 of one or more of the box tiles.

Figure 25B:
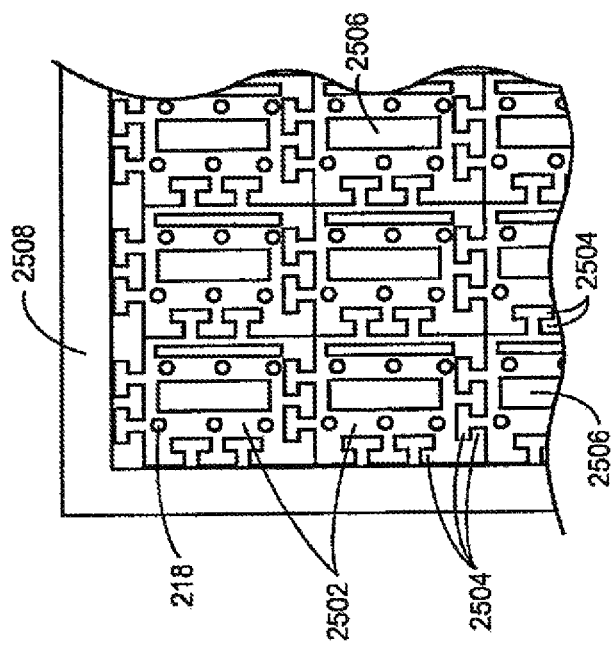
FIG. 25B is a fragmentary top view of a frame in which the tiles shown in FIG. 25A have been assembled in interlocked matrix form.
Figure 25A:
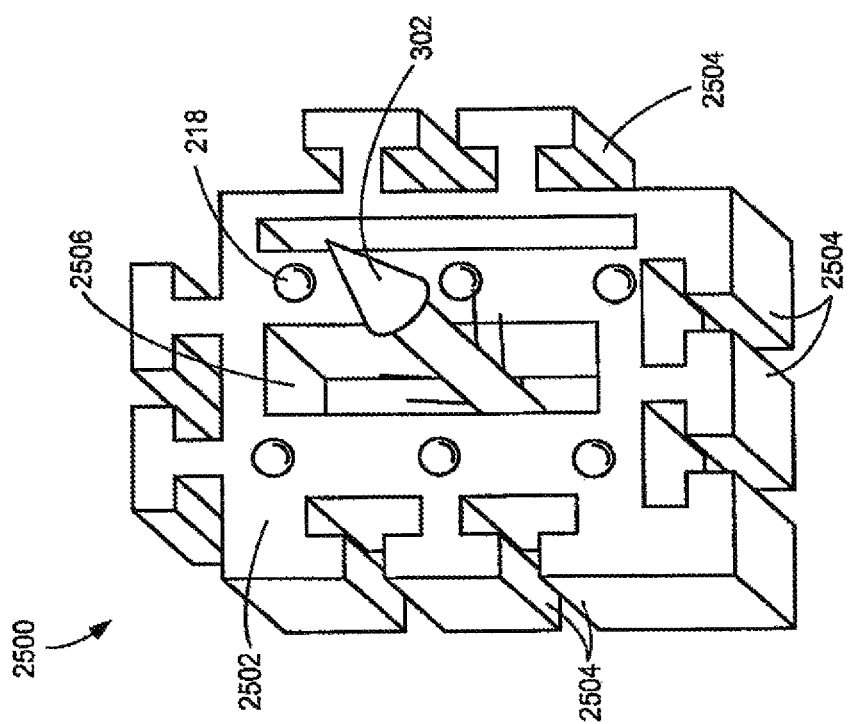
FIG. 25A is an isometric view of an embodiment in which interlockable tiles fit together, structurally join, and interlock to form a structurally integrated, rigid, interlocked, three-dimensional tile matrix.

Referring now to FIG. 25A, therein is shown an isometric view of an embodiment 2500 in which tiles 2502 are formed, for example by extrusion, as interlockable tiles. In one embodiment, the tiles 2502 are interlockable extruded tiles that are structurally fitted together to join and interlock to each other to form a structurally integrated, rigid, three-dimensional, self-supporting tile matrix structure.

The tiles 2502 have fins 2504 around the periphery thereof that are configured in an interlocking geometry, that is, that provide for joining and interlocking the tiles 2502 to each other. The tiles 2502, in one embodiment, also contain a slot 2506 that passes through the center or core of the tile 2502 to reduce the weight of the tile 2502 as well as increase the air thermal contact convection area and surface area thereof for enhanced heat exchange and dissipation. Increasing air thermal contact and improving heat exchange and dissipation can also be provided by the large surface area of the fins 2504.

Where advantageous, additional elements, such as the spacers 302, can be accommodated through the slot 2506 as well.

Referring now to FIG. 25B, therein is shown a fragmentary top view of a frame 2508 in which the tiles 2502 have been assembled in interlocked, matrix form. Due to the three-dimensional and interlocking properties of the tiles 2502, they are self-supporting, and can be configured and dimensioned to fit together, such as by a press-fit, to form a three-dimensional, self-supporting structural plate. The tile matrix may then be assembled into the frame 2508 for incorporation into a display.

Referring now to FIG. 25C, therein is shown a partially exploded, fragmentary, isometric view of a display 2510 utilizing the structure of FIG. 25B. The tiles 2502 have been press-fit together to form a three-dimensional structural plate, and these, in turn, have been incorporated into the frame 2508.

A reflective sheet 2512 having holes 2514 therein may then be positioned on top of the tiles 2502. The holes 2514 are positioned to match the locations of the LEDs 218, so that the LEDs 218 then extend upwardly through the holes 2514. The reflective sheet 2512 then reflects light from the LEDs 218 upwardly, increasing the brightness of the display 2510. In one embodiment, the reflective sheet 2512 is configured as a reflective paper layer that is adjacent and substantially surrounding the individual LEDs 218 on the tiles 2502 to reduce light loss therefrom.

A cover sheet 2516 of suitable transparent material may then be located on top of the reflective sheet 2512.

Referring now to FIG. 25D, therein is shown a rear isometric view of the display 2510 attached by a pivot 2518 to a support arm stand assembly 2520. In this embodiment, the three-dimensional matrix of the tiles 2502 is structurally mounted and interlocked to the frame 2508 of the display 2510 to form an integrated, unitized display assembly. The display 2510 is thus self-supporting, so that it can be attached directly to the support arm stand assembly 2520 through the integral pivot 2518 thereon.

Referring now to FIG. 26, therein is shown a fragmentary side cross-sectional view of an embodiment 2600 in which tiles 2602 in an LED tile matrix of a visual display light source are enhanced by LED edge lighting. The LED edge lighting is provided by an edge reflector 2604 on at least one edge, and preferably around the edges 2606, of the LED tiles 2602. The edge reflector 2604 may be conveniently supported by the tiles 2602 thereadjacent. The edge reflectors 2604 thus reduce dimming at the edges of a display screen 2608 by reflecting light, originating from the tiles 2602 of the LED tile matrix, back toward the screen 2608.

Referring now to FIG. 27A, therein is shown a fragmentary isometric exploded view of an embodiment 2700 having LED edge lighting that is provided by an additional LED light bank 2702 that is located at one or more of the edges 2704 of the tiles 2706 at the perimeter of the LED tile matrix that forms the visual display light source. The LED light banks 2702, in one embodiment, may be directly supported by the tile 2706 thereadjacent, such as by a hook-and-slot configuration 2708 formed in the LED light bank 2702 and the tile 2706.

Referring now to FIG. 27B, therein is shown a fragmentary side cross-sectional view of the structure of FIG. 27A assembled into a display 2710. Advantageously, the LED edge lighting that is provided by the LED light bank 2702 thus provides LEDs 2712 that extend beyond the outer dimensions of a screen 2714 that is being lighted thereby.

Figure 28:
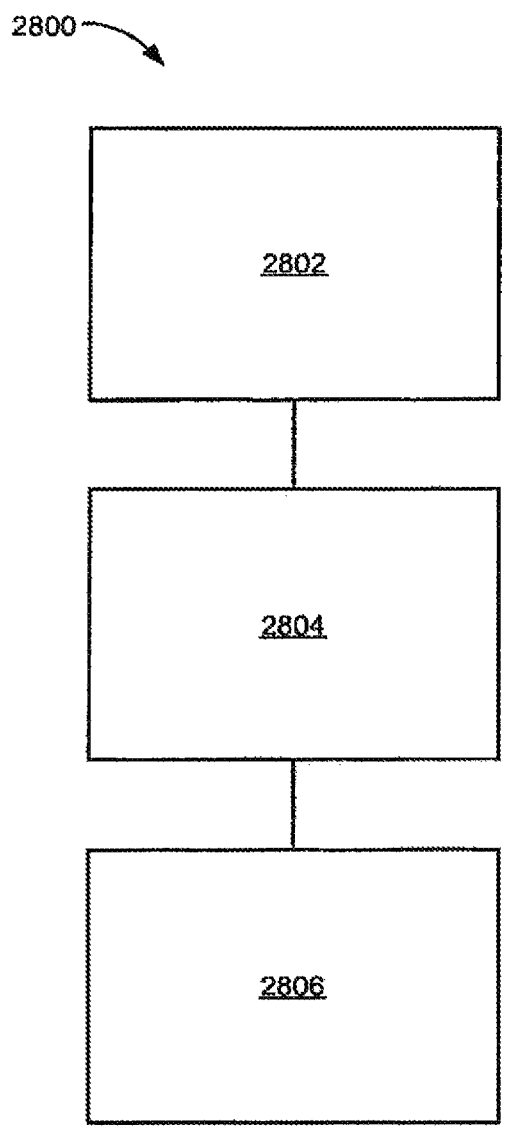
FIG. 28 is a flow chart of a display system with a distributed LED backlight in an embodiment of the present invention.

Referring now to FIG. 28, therein is shown a flow chart of a display system 2800 with a distributed LED backlight in an embodiment of the present invention. The display system 2800 includes providing a plurality of tile LED light sources, each tile LED light source having a tile and a plurality of similar LED light sources on each tile connected for emitting light therefrom, in a block 2802; orienting the plurality of tile LED light sources for illuminating a display from the back of the display in a block 2804; and integrating the plurality of tile LED light sources into a thermally and mechanically structurally integrated distributed LED tile matrix backlight light source in a block 2806.

It has been discovered that the present invention thus has numerous aspects.

A principle aspect that has been unexpectedly discovered is that the present invention enables commercially viable displays for general consumption that not only afford the very highest quality, but are economical to manufacture, thin, lightweight, strong, and provide efficient light management capability in acceptable form factors and with acceptable cost.

Another aspect is that wire mazes, bulky circuit boards, heavy and bulky mounts and supports, and complicated heat removal configurations are not necessary with the present invention.

Another important aspect is that the present invention is thermally and mechanically structurally integrated into a distributed LED tile matrix backlight light source configuration that enables not only two-dimensional, but even more advantageously, three-dimensional structural integration, strength, and integrity.

Another aspect is that the structural integration of the LED light sources into a thermally and mechanically structurally integrated distributed LED tile matrix backlight light source provides for forming rows with increased rigidity.

Yet another aspect is that the present invention supports and facilitates integration of the LED tiles into structurally integrated multi-row arrays.

Still another aspect of the present invention is that the increased strength, rigidity, and integrity provide for readily maintaining array flatness.

Another aspect is that the structural integration of the LED light sources into a thermally and mechanically structurally integrated distributed LED tile matrix backlight light source provides for greatly improved thermal uniformity within and across the extent of the tile matrix backlight light source.

Another aspect is that the present invention is highly compatible with existing overall CCFL-based display system configurations and form factors.

Another significant aspect is that the present invention thus enables LED light source, large-size displays that deliver an excellent, consistent, and affordable consumer experience.

Yet another important aspect is that individual tiles and tile bars can be qualified before the display is assembled, virtually assuring that all the LEDs in the display will match and function properly even before the display is assembled.

Yet another significant aspect of the present invention is that it valuably supports and services the historical trend of reducing costs, simplifying systems, and increasing performance.

These and other valuable aspects of the present invention consequently further the state of the technology to at least the next level.

Thus, it has been discovered that the display system with the distributed LED backlight of the present invention furnishes important and heretofore unknown and unavailable solutions, capabilities, and functional aspects for display systems with a distributed LED backlight. The resulting processes and configurations are straightforward, cost-effective, uncomplicated, highly versatile and effective, can be surprisingly and unobviously implemented by adapting known technologies, and are thus readily suited for efficiently and economically manufacturing large size display devices.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A backlight unit comprising:
    a plurality of tiles, wherein each of the plurality of tiles has a planar portion on which a plurality of light-emitting diodes is mounted and a side portion that is bent away from the planar portion, wherein a first side portion of a first tile in the plurality of tiles overlaps and is connected to a second side portion of a second tile in the plurality of tiles; and an array tray that supports the plurality of tiles, wherein the array tray has alternating ridges and grooves, and wherein the side portions are received in the grooves.

2. The backlight unit defined in claim 1, wherein the overlapping first and second side portions comprise aligned holes and wherein the backlight unit further comprises:
   a fastener that extends through the aligned holes to connect the first tile to the second tile.

3. The backlight unit defined in claim 2, wherein the fastener is a screw.

4. The backlight unit defined in claim 1, wherein each of the plurality of tiles has an additional side portion opposite the side portion, and wherein the additional side portion is bent away from the planar portion.

5. The backlight unit defined in claim 4, wherein the side portion and the additional side portion each include an opening.

6. The backlight unit defined in claim 4, wherein the side portion and the additional side portion extend downwardly from the planar portion.

7. The backlight unit defined in claim 1, wherein the planar portions overlap the ridges.

8. The backlight unit defined in claim 1, wherein the planar portion of each tile overlaps a ridge of the array tray.

9. The backlight unit defined in claim 8, wherein the planar portion of each tile has an upper surface on which the plurality of light-emitting diodes is mounted and wherein the side portion of each tile is bent away from the upper surface into one of the grooves.

10. A display comprising:
    a backlight assembly comprising:
      a rail having first and second opposing surfaces;
      a plurality of tiles mounted to the rail, wherein each of the plurality of tiles comprises a planar portion that overlaps the first surface of the rail and a tile arm that extends from an edge of the planar portion and wraps around an edge of the rail from the first surface to the second surface; and
    a plurality of light-emitting diodes mounted on the planar portion of each of the tiles.

11. The display defined in claim 10, wherein the tile arms attach the plurality of tiles to the rail.

12. The display defined in claim 10, wherein the rail comprises a protrusion that extends from the second surface.

13. The display defined in claim 12, wherein each of the plurality of tiles comprises an additional tile arm that extends from an opposing edge of the planar portion and wraps around an opposing edge of the rail from the first surface to the second surface.

14. The display defined in claim 13, wherein the protrusion extends between the tile arm and the additional tile arm.

15. The display defined in claim 10, wherein the tile arm comprises a spring finger that extends under the second surface of the rail.

16. The display defined in claim 15, wherein the second surface of the rail comprises a pocket in which the spring finger is received to secure each of the plurality of tiles to the rail.

17. A backlight assembly comprising:
    a plurality of tiles;
    a plurality of light-emitting diodes mounted to each of the plurality of tiles;
    a rail having a planar portion on which each of the plurality of tiles rests and a protrusion that extends from the planar portion to form a retaining channel, wherein a first edge of each of the plurality of tiles is received in the retaining channel; and
    a retainer spring that is attached to the rail and that presses an opposing second edge of each of the plurality of tiles against the rail.

18. The backlight assembly defined in claim 17, wherein the protrusion overlaps the first edge of each of the plurality of tiles that is received in the retaining channel.

19. The backlight assembly defined in claim 17 further comprising a fastener that extends into the rail to attach the retainer spring to the rail.

20. The backlight assembly defined in claim 17 further comprising an array tray, wherein the rail is one of a plurality of rails that are attached to the array tray.

* * * * *